United States Patent
Levien et al.

(10) Patent No.: US 9,477,943 B2
(45) Date of Patent: Oct. 25, 2016

(54) MULTI-MODALITY COMMUNICATION

(75) Inventors: Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/200,741

(22) Filed: Sep. 28, 2011

(65) Prior Publication Data
US 2013/0079052 A1    Mar. 28, 2013

(51) Int. Cl.
| | |
|---|---|
| H04M 1/00 | (2006.01) |
| G06Q 10/10 | (2012.01) |
| H04L 29/08 | (2006.01) |
| H04L 29/06 | (2006.01) |

(52) U.S. Cl.
CPC ............ G06Q 10/10 (2013.01); H04L 67/30 (2013.01); H04L 69/24 (2013.01)

(58) Field of Classification Search
CPC ..... H04W 4/16; H04W 8/245; H04W 84/16; H04W 88/06; H04W 80/04; H04M 1/72519; H04M 1/6066; H04M 1/6091; H04M 3/54; H04L 2012/5607; H04Q 3/66
USPC ...... 455/417, 418, 466, 550.1, 552.1, 553.1, 455/567, 569.1, 0.2; 370/310.2, 328; 379/211.01, 211.02, 212.01, 221.01
See application file for complete search history.

(56) References Cited

U.S. PATENT DOCUMENTS

| | | | |
|---|---|---|---|
| 5,280,521 A | 1/1994 | Itoh | |
| 5,710,806 A | 1/1998 | Lee | |
| 5,724,410 A | 3/1998 | Parvulescu | |
| 6,249,808 B1 | 6/2001 | Seshadri | |
| 6,259,706 B1 | 7/2001 | Shimada | |
| 6,301,338 B1 * | 10/2001 | Makela et al. | 379/88.21 |
| 6,366,651 B1 | 4/2002 | Griffith | |
| 6,504,910 B1 | 1/2003 | Engelke | |
| 6,701,162 B1 | 3/2004 | Everett | |
| 6,742,059 B1 | 5/2004 | Todd et al. | |
| 6,954,781 B2 | 10/2005 | Bhattacharya | |
| 7,076,255 B2 * | 7/2006 | Parupudi et al. | 455/456.1 |
| 7,103,349 B2 | 9/2006 | Himanen | |
| 7,133,899 B2 | 11/2006 | Rowe | |
| 7,184,786 B2 | 2/2007 | Mumick | |
| 7,359,492 B2 | 4/2008 | Myers | |
| 7,428,580 B2 * | 9/2008 | Hullfish et al. | 709/207 |
| 7,496,625 B1 | 2/2009 | Belcher | |
| 7,523,226 B2 | 4/2009 | Anderson et al. | |
| 7,551,583 B1 * | 6/2009 | Gazzard | 370/331 |
| 7,555,521 B1 | 6/2009 | McLaughlin | |
| 7,702,792 B2 | 4/2010 | Shaffer | |

(Continued)

OTHER PUBLICATIONS

"Apache Wave;" Wikipedia, Sep. 24, 2011, pp. 1-6; located at: http://en.wikipedia.org/wiki/Apache_Wave.

(Continued)

*Primary Examiner* — Steve D Agosta

(57) ABSTRACT

Disclosed herein are example embodiments for multi-modality communications. By way of example but not limitation, a local user may interact with a local communication device via a local communication modality for a given communication, and a remote user may interact with a remote communication device via a remote communication modality for the given communication.

34 Claims, 18 Drawing Sheets

(56) References Cited

U.S. PATENT DOCUMENTS

| | | |
|---|---|---|
| 7,725,116 B2 | 5/2010 | Mumick |
| 7,733,903 B2 | 6/2010 | Bhogal |
| 7,814,160 B2 | 10/2010 | Burtner et al. |
| 7,912,187 B1 | 3/2011 | Mikan |
| 7,921,158 B2 | 4/2011 | Mandalia et al. |
| 7,983,706 B2 | 7/2011 | Wolter |
| 8,041,025 B2 | 10/2011 | Dolph et al. |
| 8,260,332 B2 | 9/2012 | Reunamäki |
| 8,315,361 B1 | 11/2012 | Becker et al. |
| 2001/0033639 A1 | 10/2001 | Martin |
| 2002/0046262 A1 | 4/2002 | Heilig et al. |
| 2002/0055350 A1 | 5/2002 | Gupte et al. |
| 2002/0077830 A1 | 6/2002 | Suomela et al. |
| 2002/0169610 A1 | 11/2002 | Luegger |
| 2003/0028601 A1 | 2/2003 | Rowe |
| 2003/0064716 A1 | 4/2003 | Gailey et al. |
| 2003/0069997 A1 | 4/2003 | Bravin et al. |
| 2003/0081739 A1 | 5/2003 | Hikishima |
| 2003/0125952 A1 | 7/2003 | Engelke et al. |
| 2003/0174155 A1 | 9/2003 | Weng et al. |
| 2004/0015504 A1 | 1/2004 | Ahad et al. |
| 2004/0015547 A1 | 1/2004 | Griffin et al. |
| 2004/0034531 A1 | 2/2004 | Chou et al. |
| 2004/0034690 A1 | 2/2004 | Schmitz et al. |
| 2004/0057562 A1 | 3/2004 | Myers et al. |
| 2004/0082317 A1* | 4/2004 | Graefen ............... 455/413 |
| 2004/0117804 A1 | 6/2004 | Scahill et al. |
| 2004/0139157 A1 | 7/2004 | Neely, III et al. |
| 2004/0203708 A1 | 10/2004 | Khan et al. |
| 2004/0267527 A1 | 12/2004 | Creamer et al. |
| 2004/0268265 A1 | 12/2004 | Berger |
| 2005/0021868 A1 | 1/2005 | Sharma et al. |
| 2005/0049879 A1 | 3/2005 | Audu et al. |
| 2005/0135595 A1 | 6/2005 | Bushey et al. |
| 2005/0136955 A1 | 6/2005 | Mumick et al. |
| 2005/0198096 A1 | 9/2005 | Shaffer et al. |
| 2005/0250550 A1 | 11/2005 | Fields |
| 2005/0255837 A1 | 11/2005 | Kwon |
| 2006/0052127 A1 | 3/2006 | Wolter |
| 2006/0066717 A1 | 3/2006 | Miceli |
| 2006/0104293 A1 | 5/2006 | Kopp et al. |
| 2006/0159099 A1 | 7/2006 | Hensley |
| 2006/0168095 A1 | 7/2006 | Sharma et al. |
| 2006/0189333 A1 | 8/2006 | Othmer |
| 2006/0217159 A1 | 9/2006 | Watson |
| 2006/0224623 A1 | 10/2006 | Graziadio et al. |
| 2006/0293888 A1 | 12/2006 | Jindal |
| 2007/0005366 A1 | 1/2007 | Sravanapudi et al. |
| 2007/0082686 A1 | 4/2007 | Mumick et al. |
| 2007/0192418 A1* | 8/2007 | Adams et al. ............... 709/206 |
| 2007/0203987 A1 | 8/2007 | Amis |
| 2007/0238474 A1* | 10/2007 | Ballas et al. ............... 455/466 |
| 2007/0260984 A1 | 11/2007 | Marks et al. |
| 2008/0057925 A1 | 3/2008 | Ansari |
| 2008/0068671 A1 | 3/2008 | Yoshida et al. |
| 2008/0095332 A1 | 4/2008 | Myers et al. |
| 2008/0119137 A1 | 5/2008 | Lee |
| 2008/0148154 A1 | 6/2008 | Burrell et al. |
| 2008/0192736 A1 | 8/2008 | Jabri et al. |
| 2008/0232248 A1 | 9/2008 | Barave et al. |
| 2008/0248818 A1 | 10/2008 | Venkatesulu et al. |
| 2009/0028306 A1 | 1/2009 | Rhie |
| 2009/0037170 A1 | 2/2009 | Williams |
| 2009/0135741 A1 | 5/2009 | Mykhalchuk et al. |
| 2009/0150574 A1 | 6/2009 | Kawahara et al. |
| 2009/0186636 A1 | 7/2009 | Salonen |
| 2009/0216840 A1 | 8/2009 | Pajunen et al. |
| 2009/0238346 A1 | 9/2009 | Toutain et al. |
| 2009/0276539 A1 | 11/2009 | Huerta et al. |
| 2009/0279455 A1 | 11/2009 | Wang et al. |
| 2009/0290691 A1 | 11/2009 | Salonen |
| 2009/0319918 A1 | 12/2009 | Affronti et al. |
| 2009/0325546 A1 | 12/2009 | Reddy et al. |
| 2010/0011069 A1 | 1/2010 | Haruna et al. |
| 2010/0030557 A1 | 2/2010 | Molloy et al. |
| 2010/0053212 A1 | 3/2010 | Kang et al. |
| 2010/0057466 A1 | 3/2010 | Garg et al. |
| 2010/0100809 A1 | 4/2010 | Thomas et al. |
| 2010/0150333 A1 | 6/2010 | Goodman et al. |
| 2010/0169096 A1 | 7/2010 | Lv et al. |
| 2010/0174421 A1 | 7/2010 | Tsai et al. |
| 2010/0191590 A1 | 7/2010 | Hakkarainen et al. |
| 2010/0211389 A1 | 8/2010 | Marquardt |
| 2010/0211695 A1 | 8/2010 | Steinmetz et al. |
| 2010/0239081 A1 | 9/2010 | Krantz et al. |
| 2010/0251124 A1 | 9/2010 | Geppert et al. |
| 2010/0269134 A1 | 10/2010 | Storan et al. |
| 2010/0322395 A1 | 12/2010 | Michaelis et al. |
| 2011/0028168 A1 | 2/2011 | Champlin et al. |
| 2011/0038512 A1 | 2/2011 | Petrou et al. |
| 2011/0105087 A1 | 5/2011 | Toebes et al. |
| 2011/0116610 A1 | 5/2011 | Shaw et al. |
| 2011/0130168 A1 | 6/2011 | Vendrow et al. |
| 2011/0170675 A1 | 7/2011 | Mikan et al. |
| 2011/0177800 A1 | 7/2011 | Gilson |
| 2011/0179180 A1 | 7/2011 | Schleifer et al. |
| 2011/0211679 A1 | 9/2011 | Mezhibovsky et al. |
| 2011/0212737 A1 | 9/2011 | Isidore |
| 2011/0270613 A1 | 11/2011 | Da Palma et al. |
| 2011/0294525 A1 | 12/2011 | Jonsson |
| 2012/0034904 A1 | 2/2012 | LeBeau et al. |
| 2012/0077526 A1 | 3/2012 | Riffe |
| 2012/0096095 A1 | 4/2012 | Bhargava |
| 2012/0237009 A1 | 9/2012 | Szpilfogel |
| 2013/0040660 A1 | 2/2013 | Fisher et al. |
| 2013/0079061 A1 | 3/2013 | Jadhav et al. |
| 2013/0158988 A1 | 6/2013 | Katis et al. |

OTHER PUBLICATIONS

"Telecommunications device for the deaf:" Wikipedia, Sep. 25, 2011, pp. 1-8; located at: http://en.wikipedia.org/wiki/Telecommunications_device_for_the_deaf.

"Google Wave Federation Protocol," Wikipedia, Sep. 24, 2011, pp. 1-3; located at: http://en.wikipedia.org/wiki/Google_Wave_Federation_Protocol.

"Interactive voice response," Wikipedia, Sep. 25, 2011, pp. 1-8; located at: http://en.wikipedia.org/wiki/Interactive_voice_response.

Brown, D.M.; "How to Make a Phone Call Using Text to Speech Software;" eHow.com, pp. 1-2; located at http://www.ehow.com/print/how_6075364_make-using-text-speech-software.html.

* cited by examiner

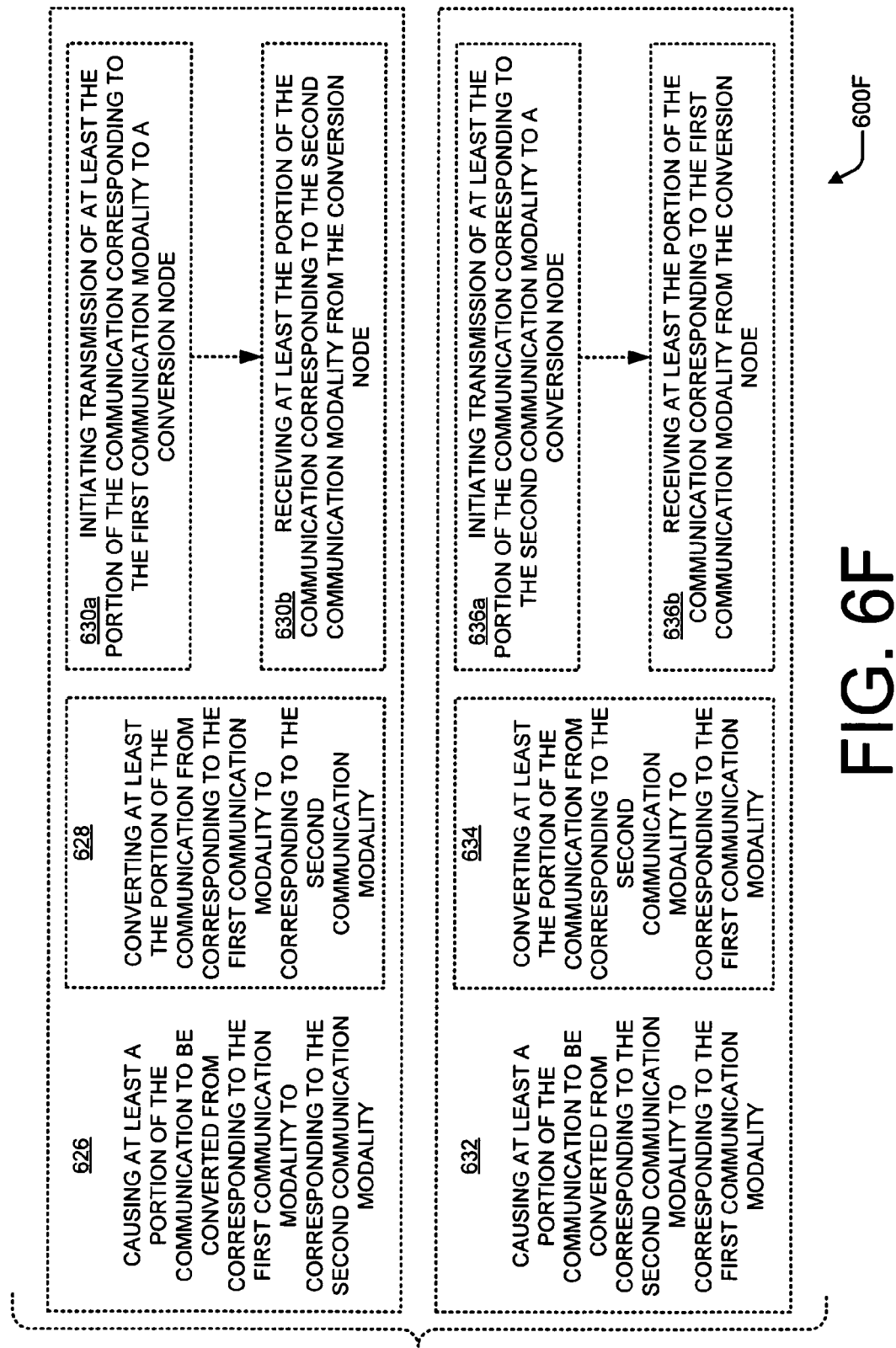

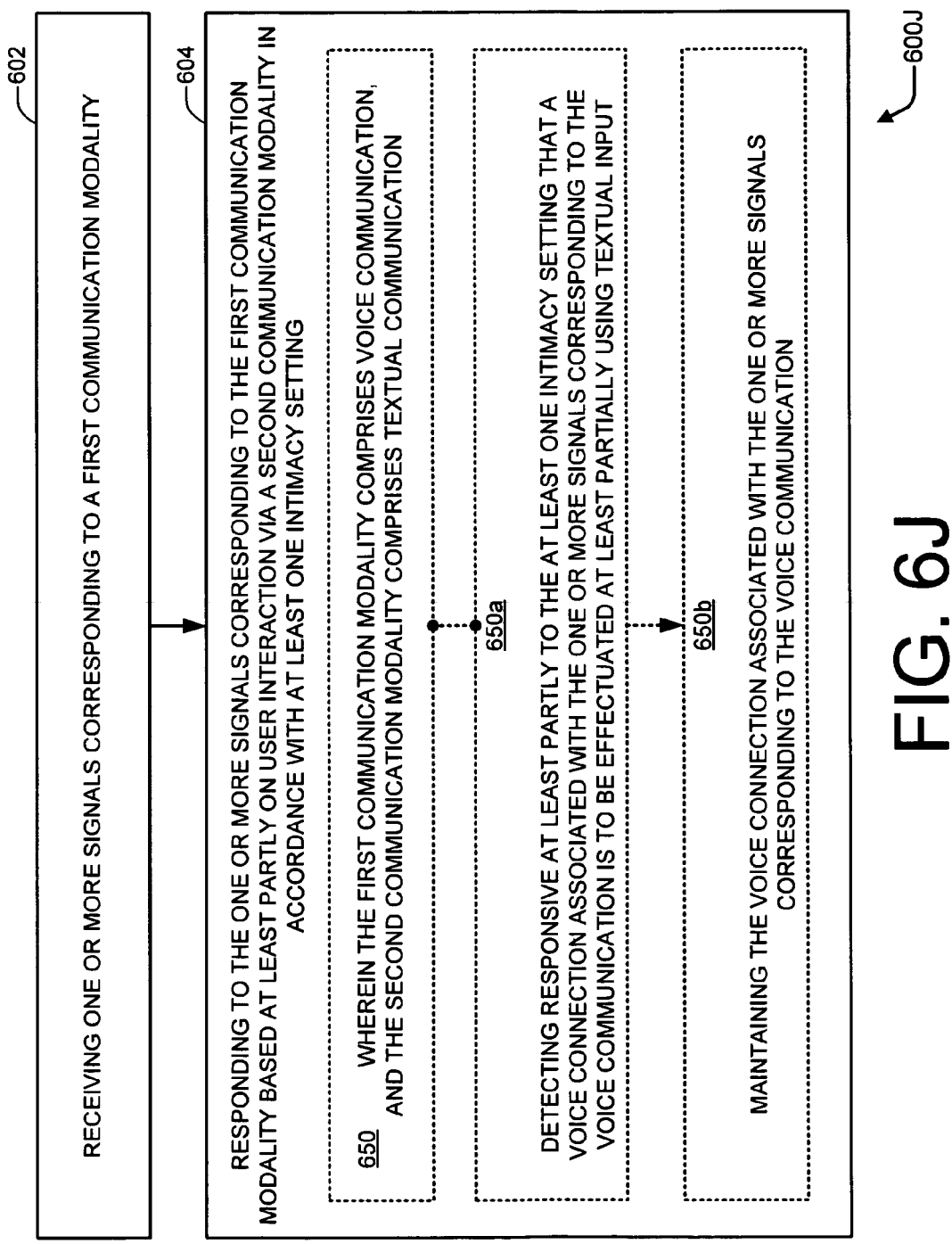

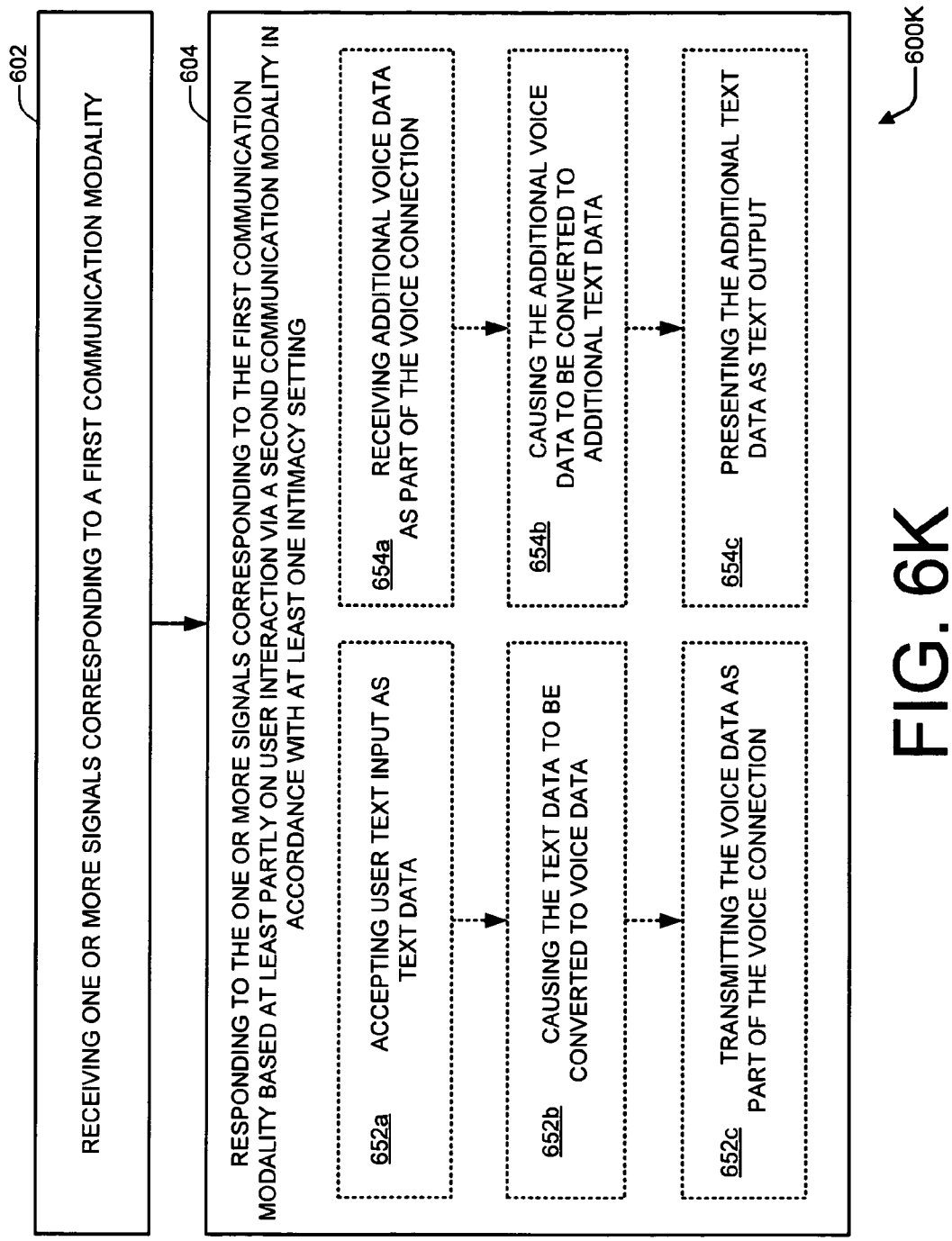

MULTI-MODALITY COMMUNICATION

BRIEF DESCRIPTION OF THE FIGURES

FIGS. 6B-6K depict example alternatives for a flow diagram of FIG. 6A in accordance with certain example embodiments.

DETAILED DESCRIPTION

Figure 1:
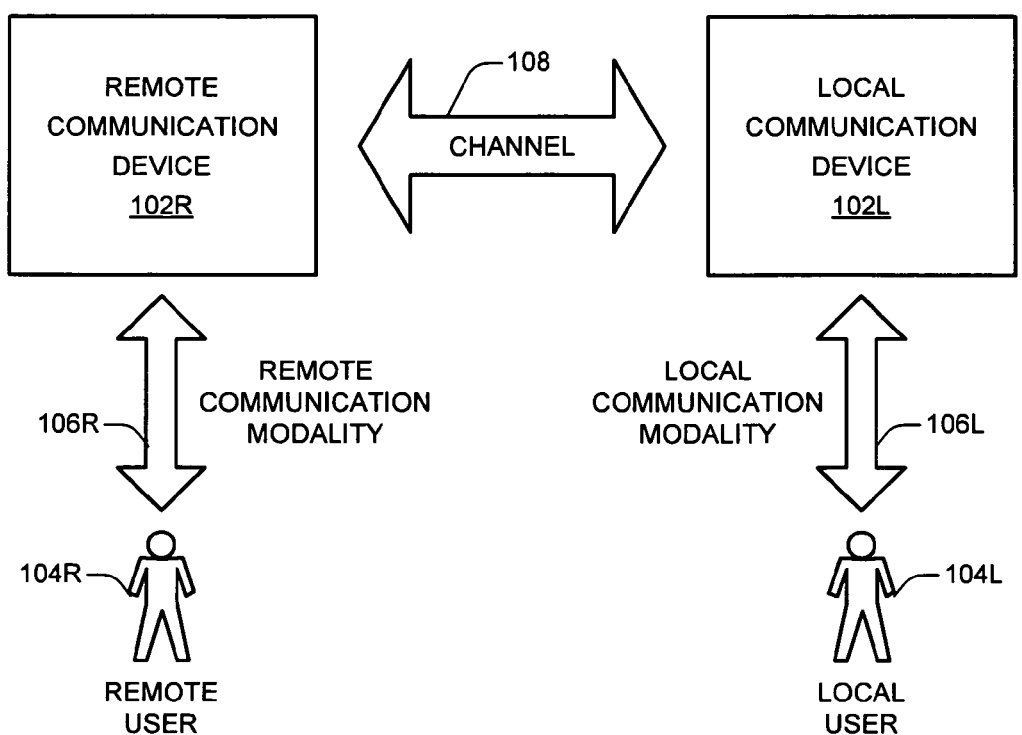
FIG. 1 is schematic diagram of two communication devices that may be participating in an example communication in accordance with certain example embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is schematic diagram 100 of two communication devices that may be participating in an example communication in accordance with certain example embodiments. As shown in FIG. 1, by way of example but not limitation, schematic diagram 100 may include communication devices 102, users 104, communication modalities 106, or at least one channel 108. More specifically, schematic diagram 100 may include a remote communication device 102R, a remote user 104R, a remote communication modality 106R, a local communication device 102L, a local user 104L, a local communication modality 106L, or a channel 108.

For certain example embodiments, a user 104 may be associated with a communication device 102. A user 104 may be interacting with a communication device 102 via at least one communication modality 106. Communication devices 102 may comprise, by way of example but not limitation, a mobile phone, a mobile terminal, a laptop or notebook computer, a personal digital assistant (PDA), a netbook, an entertainment appliance (e.g., a television, a gaming console, a set-top box, a music player, some combination thereof, etc.), a smart phone, a portable gaming device, a user equipment, a tablet or slate computer, a home phone, a desktop computer, a personal navigation device (PND), a vehicle with user-accessible communication capabilities, a private branch exchange (PBX)-based phone, videoconferencing equipment, any combination thereof, and so forth. A user 104 may comprise, by way of example only, a person. Example communication modalities 106 may include, by way of example but not limitation, a textual communication modality (e.g., wherein text may be communicated such as via a text message), a vocal communication modality (e.g., wherein sounds may be communicated such as via a voice call or teleconference), a visual communication modality (e.g., wherein moving images may be communicated such as via a video call or video conference), any combination thereof, and so forth.

For certain example embodiments, remote user 104R may be associated with remote communication device 102R. Remote user 104R may be interacting with remote communication device 102R via at least one remote communication modality 106R. Local user 104L may be associated with local communication device 102L. Local user 104L may be interacting with local communication device 102L via at least one local communication modality 106L. Remote communication device 102R or remote user 104R may be participating in at least one communication with local communication device 102L or local user 104L via one or more channels 108. A channel 108 may comprise, by way of example but not limitation, one or more of: at least one wired link, at least one wireless link, at least part of public network, at least part of a private network, at least part of a packet-switched network, at least part of a circuit-switched network, at least part of an infrastructure network, at least part of an ad hoc network, at least part of a public-switched telephone network (PSTN), at least part of a cable network, at least part of a cellular network connection, at least part of an Internet connection, at least part of a Wi-Fi connection, at least part of a WiMax connection, multiple instances of any of the above, any combination of the above, and so forth. A channel 108 may include one or more nodes through which signals are propagated.

For certain example implementations, a communication may be initiated by remote communication device 102R, remote user 104R, local communication device 102L, local user 104L, any combination thereof, and so forth. For certain example implementations, remote communication modality 106R and local communication modality 106L may comprise a same one or more communication modalities 106 or may comprise at least one different communication modality 106. Furthermore, for certain example implementations, remote communication modality 106R or local communication modality 106L may change from one communication modality to another communication modality during a single communication, across different communications, and so forth.

Moreover, it should be understood that the terms "remote" and "local" may, depending on context, be a matter of perspective. For instance, a communication device 102 or user 104 or communication modality 106 may be considered a local one at one moment, for one communication, for one perspective, etc. but may be considered a remote one at a different moment, for a different communication, for a different perspective, etc. However, one of ordinary skill in the art will recognize that the terms "remote" and "local" may serve, depending on context, to indicate that different interactions, acts, operations, functionality, a combination thereof, etc. may be occurring at, may be more closely associated with, a combination thereof etc. one side, aspect, location, combination thereof, etc. of a communication as compared to another side, aspect, location, combination thereof, etc. of the communication. For example, one signal may be transmitted from a remote communication device 102R and received at a local communication device 102L, or another signal may be transmitted from a local communication device 102L and received at a remote communication device 102R.

Figure 2:
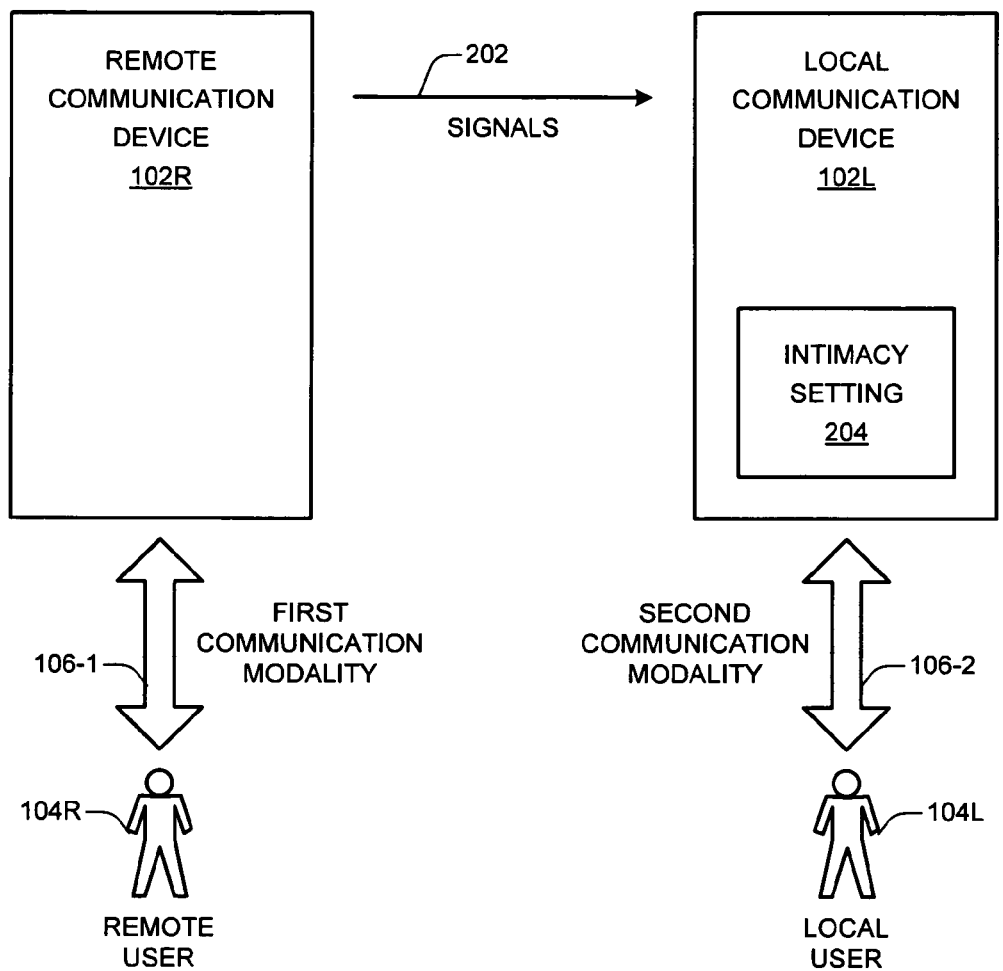
FIG. 2 is schematic diagram of two communication devices that may be participating in a communication involving two communication modalities in accordance with at least one example intimacy setting, in accordance with certain example embodiments.

FIG. 2 is schematic diagram 200 of two communication devices that may be participating in a communication involving two communication modalities in accordance with at least one example intimacy setting, in accordance with certain example embodiments. As shown in FIG. 2, by way of example but not limitation, schematic diagram 200 may include communication devices 102, users 104, communication modalities 106, or at least one signal 202. More specifically, schematic diagram 200 may include a remote communication device 102R, a remote user 104R, a first communication modality 106-1, a local communication device 102L, a local user 104L, a second communication modality 106-2, or one or more signals 202. Furthermore, at least local communication device 102L may include (e.g., store, establish, have access to, a combination thereof, etc.) at least one intimacy setting 204.

For certain example embodiments, remote user 104R may be associated with remote communication device 102R. Remote user 104R may be interacting with remote communication device 102R via at least one first communication modality 106-1. Local user 104L may be associated with local communication device 102L. Local user 104L may be interacting with local communication device 102L via at least one second communication modality 106-2. First communication modality 106-1 may differ from second communication modality 106-2. Remote communication device 102R or remote user 104R may be participating in at least one communication with local communication device 102L or local user 104L via one or more signals 202. Signals 202 may propagate via one or more channels 108 (e.g., of FIG. 1). Signals 202, by way of example but not limitation, may comprise, electrical signals, magnetic signals, electromagnetic signals, photonic signals, wireless signals, wired signals, any combination thereof, and so forth.

For certain example embodiments, a local communication device 102L may receive one or more signals 202 corresponding to a first communication modality 106-1. A local communication device 102L may respond to one or more signals 202 corresponding to first communication modality 106-1 based at least partly on local user 104L interaction via a second communication modality 106-2 in accordance with at least one intimacy setting 204. By way of example but not limitation, at least one intimacy setting 204 may indicate what kind of one or more communication modalities a user is willing to expose for at least one communication.

For certain example embodiments, at least one intimacy setting 204 may indicate how a user 104 is to interact with a communication device 102 with respect to a given communication without condition (e.g., a user may limit any current communications to text). Additionally or alternatively, at least one intimacy setting 204 may indicate how a user 104 is to interact with a communication device with respect to a given communication on a conditional basis. By way of example only, a user 104 may indicate a communication modality in at least partial dependence on whether an associated communication device 102 initiated a communication or terminated a communication. For instance, at least one intimacy setting 204 may indicate that communications are to be initiated using an interaction in accordance with a voice communication modality, but the at least one intimacy setting 204 may indicate that communications are to be terminated using a textual communication modality. Additionally or alternatively, a local user 104L may indicate a local communication modality 106L (e.g., of FIG. 1) in at least partial dependence on a remote communication modality 106R. For instance, at least one intimacy setting 204 may indicate that if a remote communication modality 106R corresponds to text, a local communication modality 106L is also to correspond to text; furthermore, the at least one intimacy setting 204 may indicate that if a remote communication modality 106R corresponds to voice, a local communication modality 106L is to correspond to text; moreover, the at least one intimacy setting 204 may indicate that if a remote communication modality 106R corresponds to video, a local communication modality 106L is to correspond to voice. Additionally or alternatively, a local user 104L may indicate a local communication modality 106L (e.g., of FIG. 1) that is based at least partially on an identity of a remote user 104R; a time of day, day of week, a combination thereof, etc.; an environmental condition (e.g., an ambient lighting level, a level or type of movement—e.g. vehicle motion may be detected, a combination thereof, etc.); any combination thereof; and so forth. However, claimed subject matter is not limited to any particular examples.

Figure 3:
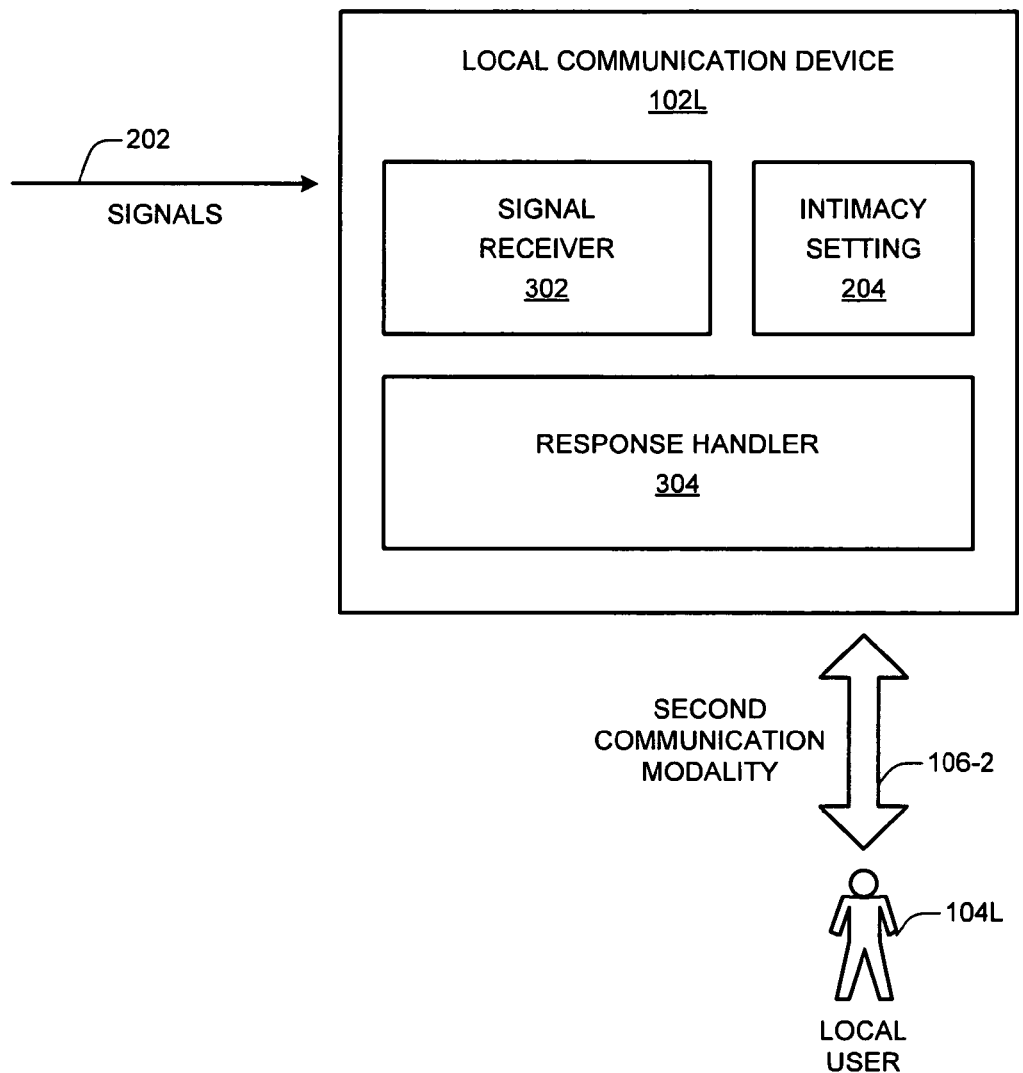
FIG. 3 is schematic diagram of an example communication device that may be participating in a communication using a signal receiver or a response handler in accordance with certain example embodiments.

FIG. 3 is schematic diagram 300 of an example communication device that may be participating in a communication using a signal receiver or a response handler in accordance with certain example embodiments. As shown in FIG. 3, by way of example but not limitation, schematic diagram 300 may include a local communication device 102L, a local user 104L, a second communication modality 106-2, or one or more signals 202. More specifically, a local communication device 102L of schematic diagram 300 may include at least one intimacy setting 204, a signal receiver 302, or a response handler 304.

For certain example embodiments, a signal receiver 302 may receive one or more signals 202 corresponding to a first communication modality 106-1. By way of example but not limitation, one or more signals 202 may correspond to first communication modality 106-1 if one or more signals 202 originated at remote communication device 102R (e.g., of FIG. 2) in at least partial dependence on interaction by remote user 104R with remote communication device 102R via first communication modality 106-1, if one or more signals 202 are derived at least partly from interaction by remote user 104R with remote communication device 102R via first communication modality 106-1, if one or more signals 202 are encoded to support user input via first communication modality 106-1, if one or more signals 202 are encoded to support user output in accordance with first communication modality 106-1, any combination thereof, and so forth. A response handler 304 may respond to one or more signals 202 corresponding to first communication modality 106-1 based at least partly on local user 104L interaction via a second communication modality 106-2 in accordance with at least one intimacy setting 204. Example implementations with respect to a response handler 304 are described herein below with particular reference to at least FIGS. 4A-4C. Additional and/or alternative implementations are described herein below with respect to at least FIGS. 6A-6K.

For certain example embodiments, signal receiver 302 and response handler 304 may comprise a single component together, a single component apiece, multiple components, or any combination thereof, and so forth. Example components for a communication device 102 are described herein below with particular reference to at least FIG. 5. By way of example but not limitation, signal receiver 302 may comprise an antenna, a wired connector, a signal downconverter, a baseband processor, a signal processing module (e.g., to account for signal manipulation for a communication protocol, to decrypt, to extract data, a combination thereof, etc.), a processor, hardware, software, firmware, logic, circuitry, any combination thereof, and so forth. By way of example but not limitation, response handler 304 may comprise an intimacy-related module, hardware, software, firmware, logic, circuitry, any combination thereof, and so forth.

Figure 4A:
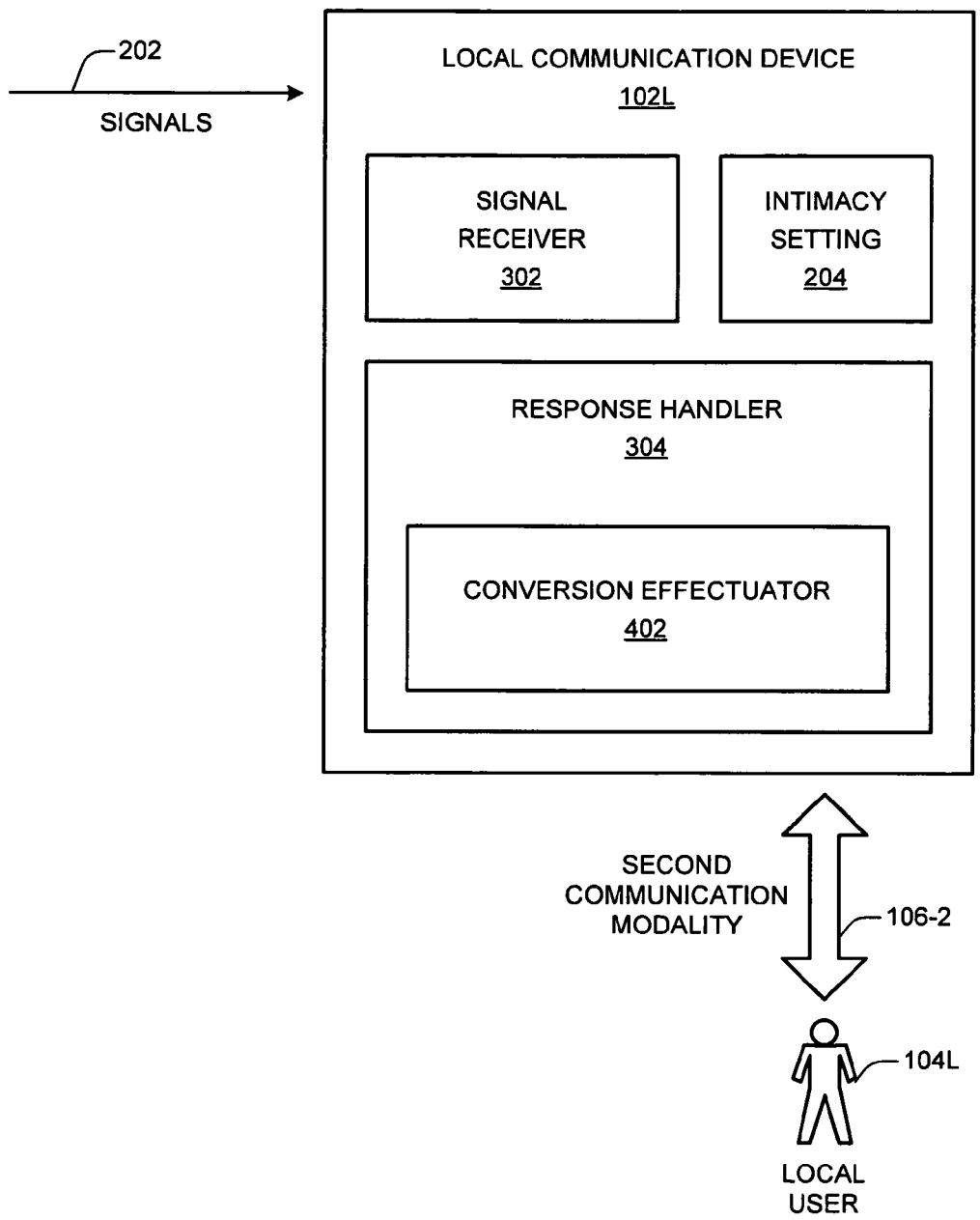
FIG. 4A is schematic diagram of a communication device that may be participating in a communication using an example response handler having a conversion effectuator in accordance with certain example embodiments.

FIG. 4A is schematic diagram 400A of a communication device that may be participating in a communication using an example response handler having a conversion effectuator in accordance with certain example embodiments. As shown in FIG. 4A, by way of example but not limitation, schematic diagram 400A may include a local communication device 102L, a local user 104L, a second communication modality 106-2, or one or more signals 202. More specifically, a local communication device 102L of schematic diagram 400A may include at least one intimacy setting 204, a signal receiver 302, or a response handler 304, which may include a conversion effectuator 402.

For certain example embodiments, a conversion effectuator 402 may cause a conversion of a correspondence with one communication modality to a correspondence with another communication modality. By way of example but not limitation, a conversion effectuator 402 may cause a conversion (e.g., of signals, such as one or more signals 202) from a correspondence with a first communication modality 106-1 to a correspondence with a second communication modality 106-2, may cause a conversion (e.g., of signals derived from user input of local user 104L) from a correspondence with a second communication modality 106-2 to a correspondence with a first communication modality 106-1, some combination thereof, and so forth. Example implementations with respect to a conversion effectuator 402 are described herein below with particular reference to at least FIGS. 4B and 4C. Additional or alternative implementations are described herein below with respect to at least FIGS. 6A-6K.

Figure 4B:
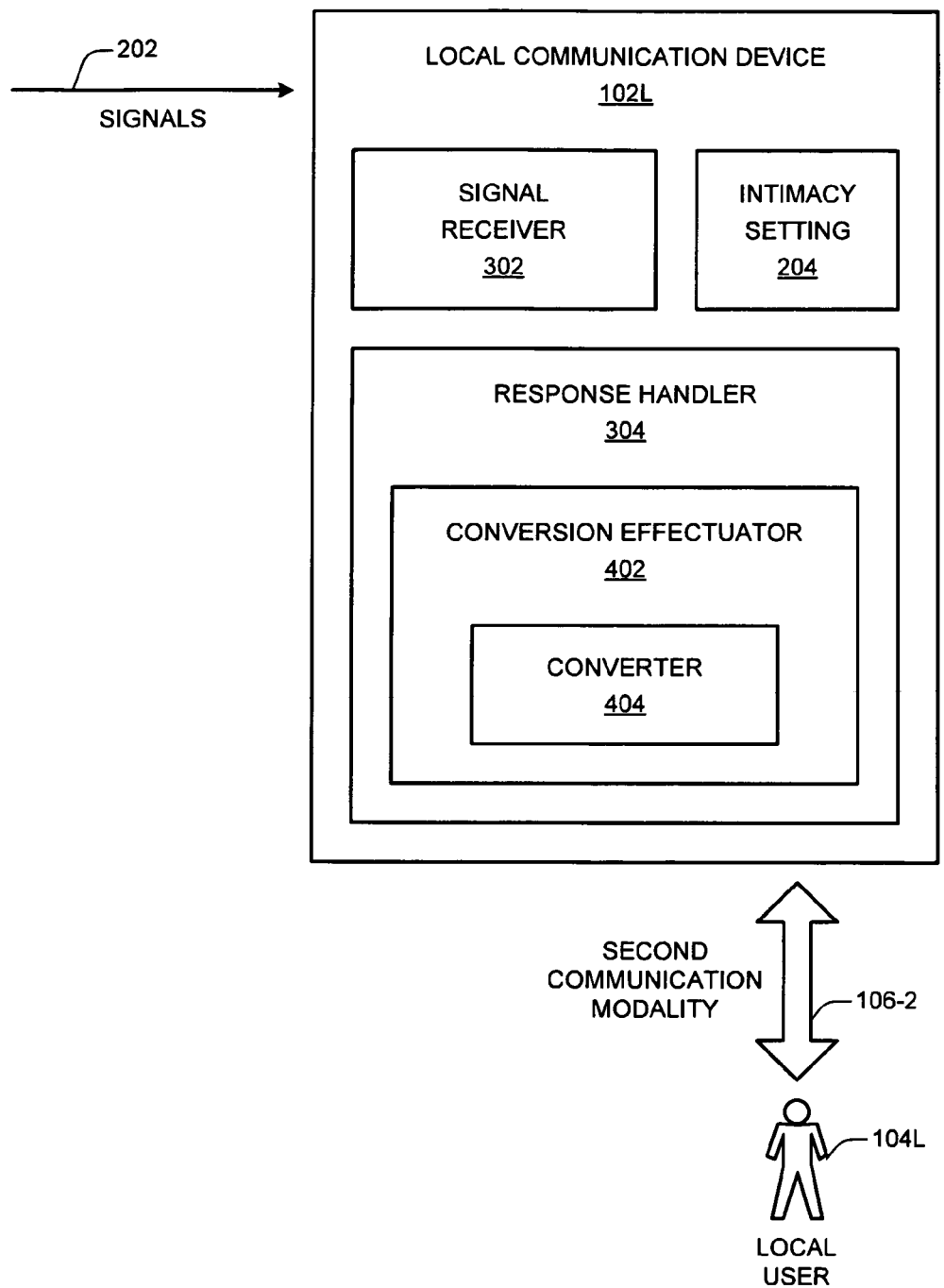
FIG. 4B is schematic diagram of a communication device that may be participating in a communication using an example conversion effectuator having a converter in accordance with certain example embodiments.

FIG. 4B is schematic diagram 400B of a communication device that may be participating in a communication using an example conversion effectuator having a converter in accordance with certain example embodiments. As shown in FIG. 4B, by way of example but not limitation, schematic diagram 400B may include a local communication device 102L that includes at least one intimacy setting 204, a signal receiver 302, or a response handler 304. More specifically, a local communication device 102L of schematic diagram 400B may include a response handler 304 having a conversion effectuator 402, which may include a converter 404.

For certain example embodiments, a converter 404 may perform a conversion of a correspondence with one communication modality to a correspondence with another communication modality. By way of example but not limitation, a converter 404 may perform a conversion (e.g., of signals) from a correspondence with a first communication modality 106-1 to a correspondence with a second communication modality 106-2, may perform a conversion (e.g., of signals) from a correspondence with a second communication modality 106-2 to a correspondence with a first communication modality 106-1, some combination thereof, and so forth. Additional or alternative implementations are described herein.

Figure 4C:
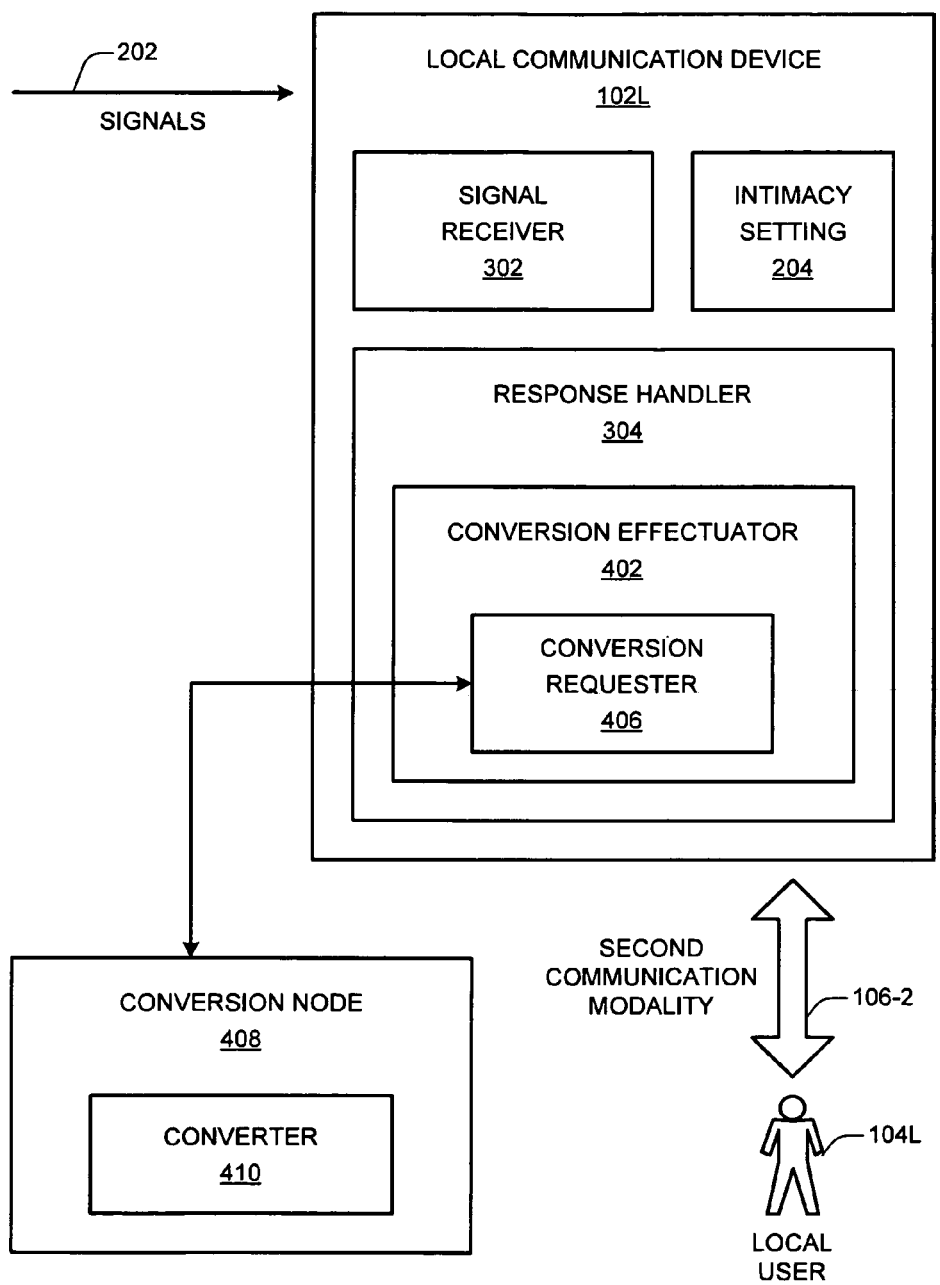
FIG. 4C is schematic diagram of a communication device that may be participating in a communication using an example conversion effectuator having a conversion requester in accordance with certain example embodiments.

FIG. 4C is schematic diagram 400C of a communication device that may be participating in a communication using an example conversion effectuator having a conversion requester in accordance with certain example embodiments. As shown in FIG. 4C, by way of example but not limitation, schematic diagram 400C may include a local communication device 102L that includes at least one intimacy setting 204, a signal receiver 302, or a response handler 304. More specifically, a local communication device 102L of schematic diagram 400C may include a response handler 304 having a conversion effectuator 402, which may include a conversion requester 406. Furthermore, by way of example but not limitation, schematic diagram 400C may include a conversion node 408, which may include a converter 410.

For certain example embodiments, a conversion effectuator 402 may cause a conversion of a correspondence with one communication modality to a correspondence with another communication modality based, at least partly, on one or more interactions with a conversion node 408 using a conversion requester 406. For certain example implementations, a conversion node may be external to local communication device 102L. A conversion node 408 may comprise, by way of example but not limitation, a telecommunications node (e.g., a switch, a router, a gateway, a combination thereof, etc.), an Internet node (e.g., a switch, a router, a server, a server blade, a virtual server machine, a combination thereof, etc.), a local area network (LAN) node, a computer, some combination thereof, and so forth.

For certain example embodiments, conversion requester 406 may transmit one or more signals (e.g., one or more signals 202 or a derivative thereof) corresponding to a first communication modality 106-1 to conversion node 408. Using converter 410, conversion node 408 may perform a conversion (e.g., of signals) from a correspondence with a first communication modality 106-1 to a correspondence with a second communication modality 106-2. Conversion node 408 may transmit one or more signals corresponding to a second communication modality 106-2 to conversion effectuator 402 (e.g., to conversion requester 406) of local communication device 102L. Additionally or alternatively, conversion requester 406 may transmit one or more signals corresponding to a second communication modality 106-2 to conversion node 408. Using converter 410, conversion node 408 may perform a conversion (e.g., of signals) from a correspondence with a second communication modality 106-2 to a correspondence with a first communication modality 106-1. Conversion node 408 may transmit one or more signals corresponding to a first communication modality 106-1 to conversion effectuator 402 (e.g., to conversion requester 406) of local communication device 102L. However, claimed subject matter is not limited to examples as described herein.

Figure 5:
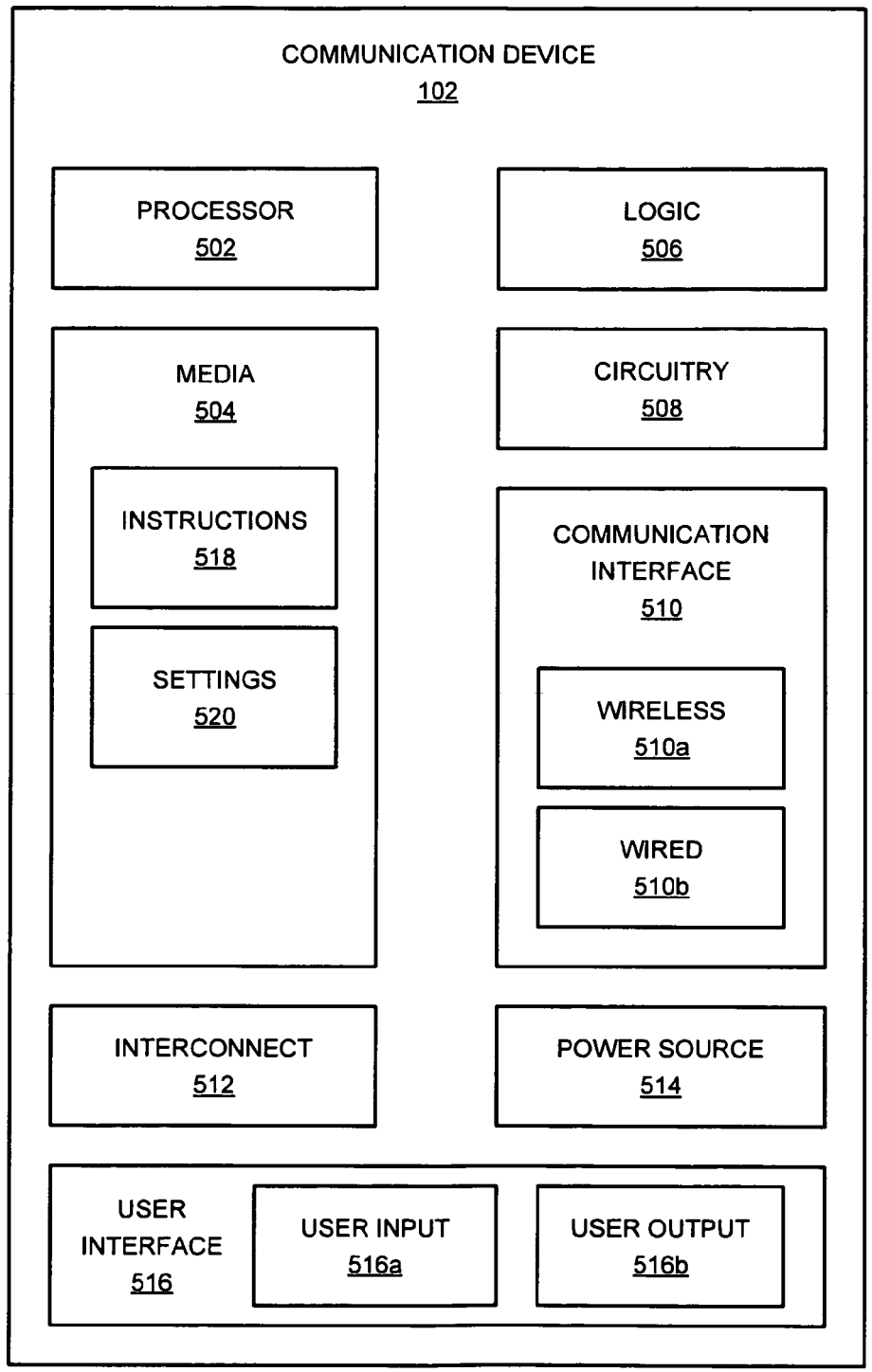
FIG. 5 is a schematic diagram of an example communication device including one or more example components in accordance with certain example embodiments.

FIG. 5 is a schematic diagram 500 of an example communication device including one or more example components in accordance with certain example embodiments. As shown in FIG. 5, a communication device 102 may include one or more components such as: at least one processor 502, one or more media 504, logic 506, circuitry 508, at least one communication interface 510, at least one interconnect 512, at least one power source 514, or at least one user interface 516, any combination thereof, and so forth. Furthermore, as shown in schematic diagram 500, one or more media may comprise one or more instructions 518, one or more settings 520, some combination thereof, and so forth; communication interface 510 may comprise at least one wireless communication interface 510a, at least one wired communication interface 510b, some combination thereof, and so forth; or user interface 516 may comprise at least one user input interface 516a, at least one user output interface 516b, some combination thereof, and so forth. However, a communication device 102 may alternatively include more, fewer, or different components from those that are illustrated without deviating from claimed subject matter.

For certain example embodiments, a communication device 102 may include or comprise at least one electronic device. Communication device 102 may comprise, for example, a computing platform or any electronic device having at least one processor or memory. Processor 502 may comprise, by way of example but not limitation, any one or more of a general-purpose processor, a specific-purpose processor, a digital signal processor (DSP), a processing unit, a combination thereof, and so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, a combination thereof, and so forth. Media 504 may bear, store, contain, provide access to, a combination thereof, etc. instructions 518, which may be executable by processor 502. Instructions 518 may comprise, by way of example but not limitation, a program, a module, an application or app (e.g., that is native, that runs in a browser, that runs within a virtual machine, a combination thereof, etc.), an operating system, etc. or portion thereof; operational data structures; processor-executable instructions; code; or any combination thereof; and so forth. Media 504 may comprise, by way of example but not limitation, processor-accessible or non-transitory media that is capable of bearing instructions, settings, a combination thereof, and so forth.

For certain example embodiments, execution of instructions 518 by one or more processors 502 may transform communication device 102 into a special-purpose computing device, apparatus, platform, or any combination thereof, etc. Instructions 518 may correspond to, for example, instructions that are capable of realizing at least a portion of one or more flow diagrams methods, processes, operations, functionality, technology, or mechanisms, etc. that are described herein or illustrated in the accompanying drawings. Settings 520 may comprise, by way of example but not limitation, one or more indicators that may be established by a user or other entity, one or more indicators that may determine at least partly how a communication device 102 is to operate or respond to situations, one or more indicators or other values that may be used to realize flow diagrams, methods, processes, operations, functionality, technology, or mechanisms, etc. that are described herein or illustrated in the accompanying drawings.

For certain example embodiments, logic 506 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings. Circuitry 508 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings, wherein circuitry 508 comprises at least one physical or hardware component or aspect.

For certain example embodiments, one or more communication interfaces 510 may provide one or more interfaces between communication device 102 and another device or a person/operator. With respect to a person/operator, a communication interface 510 may include, by way of example but not limitation, a screen, a speaker, a keyboard or keys, or other person-device input/output features. A communication interface 510 may also or alternatively include, by way of example but not limitation, a transceiver (e.g., transmitter or receiver), a radio, an antenna, a wired interface connector or other similar apparatus (e.g., a universal serial bus (USB) connector, a proprietary connector, a Thunderbolt® or Light Peak® connector, a combination thereof, etc.), a physical or logical network adapter or port, or any combination thereof, etc. to communicate wireless signals or wired signals via one or more wireless communication links or wired communication links, respectively. Communications with at least one communication interface 510 may enable transmitting, receiving, or initiating of transmissions, just to name a few examples.

For certain example embodiments, at least one interconnect 512 may enable signal communication between or among components of communication device 102. Interconnect 512 may comprise, by way of example but not limitation, one or more buses, channels, switching fabrics, or combinations thereof, and so forth. Although not explicitly illustrated in FIG. 5, one or more components of communication device 102 may be coupled to interconnect 512 via a discrete or integrated interface. By way of example only, one or more interfaces may couple a communication interface 510 or a processor 502 to at least one interconnect 512. At least one power source 514 may provide power to components of communication device 102. Power source 514 may comprise, by way of example but not limitation, a battery, a power connector, a solar power source or charger, a mechanical power source or charger, a fuel source, any combination thereof, and so forth.

For certain example embodiments, a user interface 516 may enable one or more users to interact with communication device 102. Interactions between a user and device may relate, by way of example but not limitation, to touch/tactile/feeling/haptic sensory (e.g., a user may shake or move a device which may be detected by a gyroscope, an accelerometer, a compass, a combination thereof, etc; a user may press a button, slide a switch, rotate a knob, etc.; a user may touch a touch-sensitive screen; a device may vibrate; some combination thereof; etc.), to sound/hearing/speech sensory (e.g., a user may speak into a microphone, a device may generate sounds via a speaker, some combination thereof, etc.), to sights/vision sensory (e.g., a device may activate one or more lights, modify a display screen, a combination thereof, etc.), any combination thereof, and so forth.

For certain example embodiments, a user interface 516 may comprise a user interface input 516a, a user output interface 516b, a combination thereof, and so forth. A user input interface 516a may comprise, by way of example but not limitation, a microphone, a button, a switch, a dial, a knob, a key, a keypad, a keyboard, a touch-sensitive screen, a camera, a gyroscope, an accelerometer, a compass, any combination thereof, and so forth. A user output interface 516b may comprise, by way of example but not limitation, a speaker, a screen (e.g., with or without touch-sensitivity), a vibrating haptic feature, any combination thereof, and so forth. Certain user interfaces 516 may enable both user input and user output. For example, a touch-sensitive screen may be capable of providing user output and accepting user input. Additionally or alternatively, a user interface component (e.g., that may be integrated with or separate from a communication device 102), such as a headset that has a microphone and a speaker, may enable both user input and user output.

It should be understood that for certain example implementations components illustrated separately in FIG. 5 are not necessarily separate or mutually exclusive. For example, a given component may provide multiple functionalities. By way of example only, a single component such as a USB connector may function as a wired communication interface 510*b* and a power source 514. Additionally or alternatively, a single component such as a display screen may function as a communication interface 510 with a user, as a user input interface 516*a*, or as a user output interface 516*b*. Additionally or alternatively, one or more instructions 518 may function to realize at least one setting 520.

It should also be understood that for certain example implementations components illustrated in schematic diagram 500 or described herein may not be integral or integrated with a communication device 102. For example, a component may be removably connected to a communication device 102, a component may be wirelessly coupled to a communication device 102, any combination thereof, and so forth. By way of example only, instructions 518 may be stored on a removable card having at least one medium 504. Additionally or alternatively, a user interface 516 (e.g., a wired or wireless headset, a screen, a video camera, a keyboard, a combination thereof, etc.) may be coupled to communication device 102 wirelessly or by wire. For instance, a user may provide user input or accept user output corresponding to a voice communication modality to or from, respectively, a communication device 102 via a wireless (e.g., a Bluetooth®) headset.

Figure 6A:
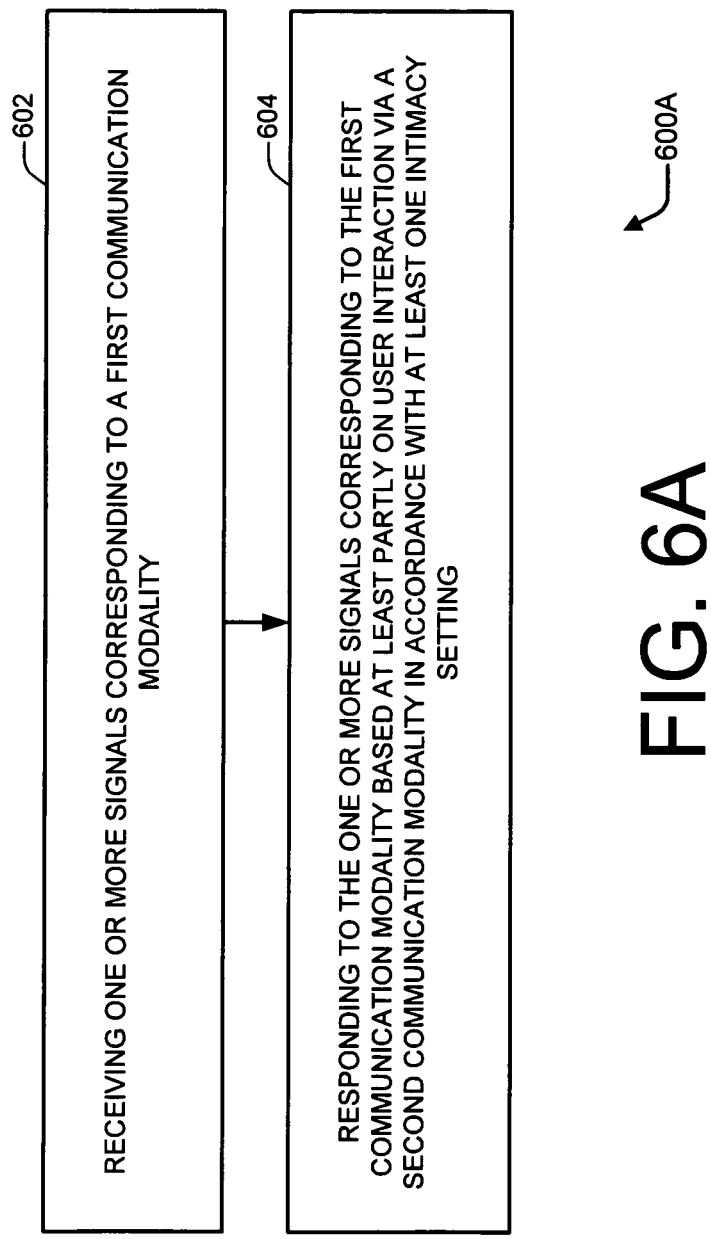
FIG. 6A is a flow diagram illustrating an example method for a communication device that may be participating in a communication involving two communication modalities in accordance with at least one example intimacy setting, in accordance with certain example embodiments.

FIG. 6A is a flow diagram 600A illustrating an example method for a communication device that may be participating in a communication involving two communication modalities in accordance with at least one example intimacy setting, in accordance with certain example embodiments. As illustrated, flow diagram 600A may include any of operations 602-604. Although operations 602-604 are shown or described in a particular order, it should be understood that methods may be performed in alternative manners without departing from claimed subject matter, including, but not limited to, with a different order or number of operations or with a different relationship between or among operations. Also, at least some operations of flow diagram 600A may be performed so as to be fully or partially overlapping with other operation(s).

For certain example embodiments, a method for handling a communication may be at least partially implemented using hardware and may comprise an operation 602 or an operation 604. An operation 602 may be directed at least partially to receiving one or more signals corresponding to a first communication modality. By way of example but not limitation, a local communication device 102L may receive one or more signals 202 corresponding to a first communication modality 106-1. An operation 604 may be directed at least partially to responding to the one or more signals corresponding to the first communication modality based at least partly on user interaction via a second communication modality in accordance with at least one intimacy setting. By way of example but not limitation, a local communication device 102L may respond to one or more signals 202 corresponding to first communication modality 106-1 based at least partly on local user 104L interaction via a second communication modality 106-2 in accordance with at least one intimacy setting 204. However, claimed subject matter is not limited to any particular described embodiments, implementations, examples, etc.

FIGS. 6B-6K depict example alternatives for a flow diagram of FIG. 6A in accordance with certain example embodiments. As illustrated, flow diagrams of FIGS. 6B-6K may include any of the illustrated or described operations. Although operations are shown or described in a particular order, it should be understood that methods may be performed in alternative manners without departing from claimed subject matter, including, but not limited to, with a different order or number of operations or with a different relationship between or among operations. Also, at least some operations of flow diagrams of FIGS. 6B-6K may be performed so as to be fully or partially overlapping with other operation(s).

Figure 6B:
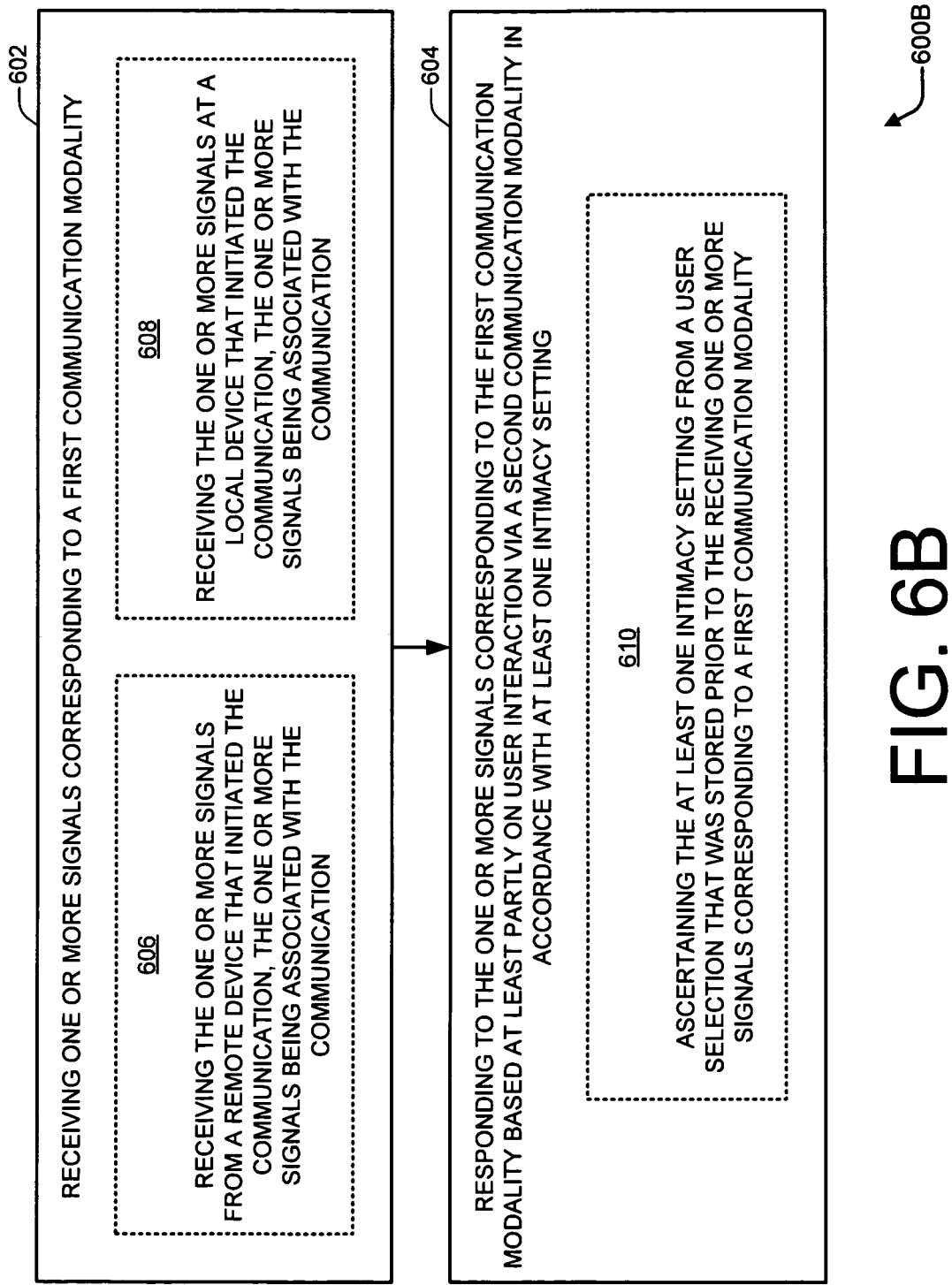

FIG. 6B illustrates example operations 606, 608, and 610. For certain example embodiments, an operation 606 may be directed at least partially to wherein the receiving one or more signals corresponding to a first communication modality comprises receiving the one or more signals from a remote device that initiated the communication, the one or more signals being associated with the communication. By way of example but not limitation, a local communication device 102L may receive one or more signals 202 from a remote communication device 102R that initiated the communication, with the one or more signals 202 being associated with the communication. For an example implementation, a remote user 104R using a remote communication device 102R may initiate a voice or text communication with a local user 104L using a local communication device 102L. However, claimed subject matter is not limited to any particular described embodiments, implementations, examples, etc.

For certain example embodiments, an operation 608 may be directed at least partially to wherein the receiving one or more signals corresponding to a first communication modality comprises receiving the one or more signals at a local device that initiated the communication, the one or more signals being associated with the communication. By way of example but not limitation, a local communication device 102L may receive one or more signals 202 in which the local communication device 102L initiated the communication, with the one or more signals 202 being associated with the communication. For an example implementation, a local user 104L using a local communication device 102L may initiate a voice or text communication with a remote user 104R using a remote communication device 102R. However, claimed subject matter is not limited to any particular described embodiments, implementations, examples, etc.

For certain example embodiments, an operation 610 may be directed at least partially to wherein the responding to the one or more signals corresponding to the first communication modality based at least partly on user interaction via a second communication modality in accordance with at least one intimacy setting comprises ascertaining the at least one intimacy setting from a user selection that was stored prior to the receiving one or more signals corresponding to a first communication modality. By way of example but not limitation, a local communication device 102L may ascertain at least one intimacy setting 204 from a user selection that was stored prior to the receiving one or more signals corresponding to a first communication modality. For an example implementation, prior to a communication being initiated or prior to receipt of one or more signals 202, a user may interact with a local communication device 102L via a user input interface 516*a* to select at least one intimacy setting 204, and local communication device 102L may store a selected communication modality 106 as an at least one intimacy setting 204. However, claimed subject matter is not limited to any particular described embodiments, implementations, examples, etc.

Figure 6C:
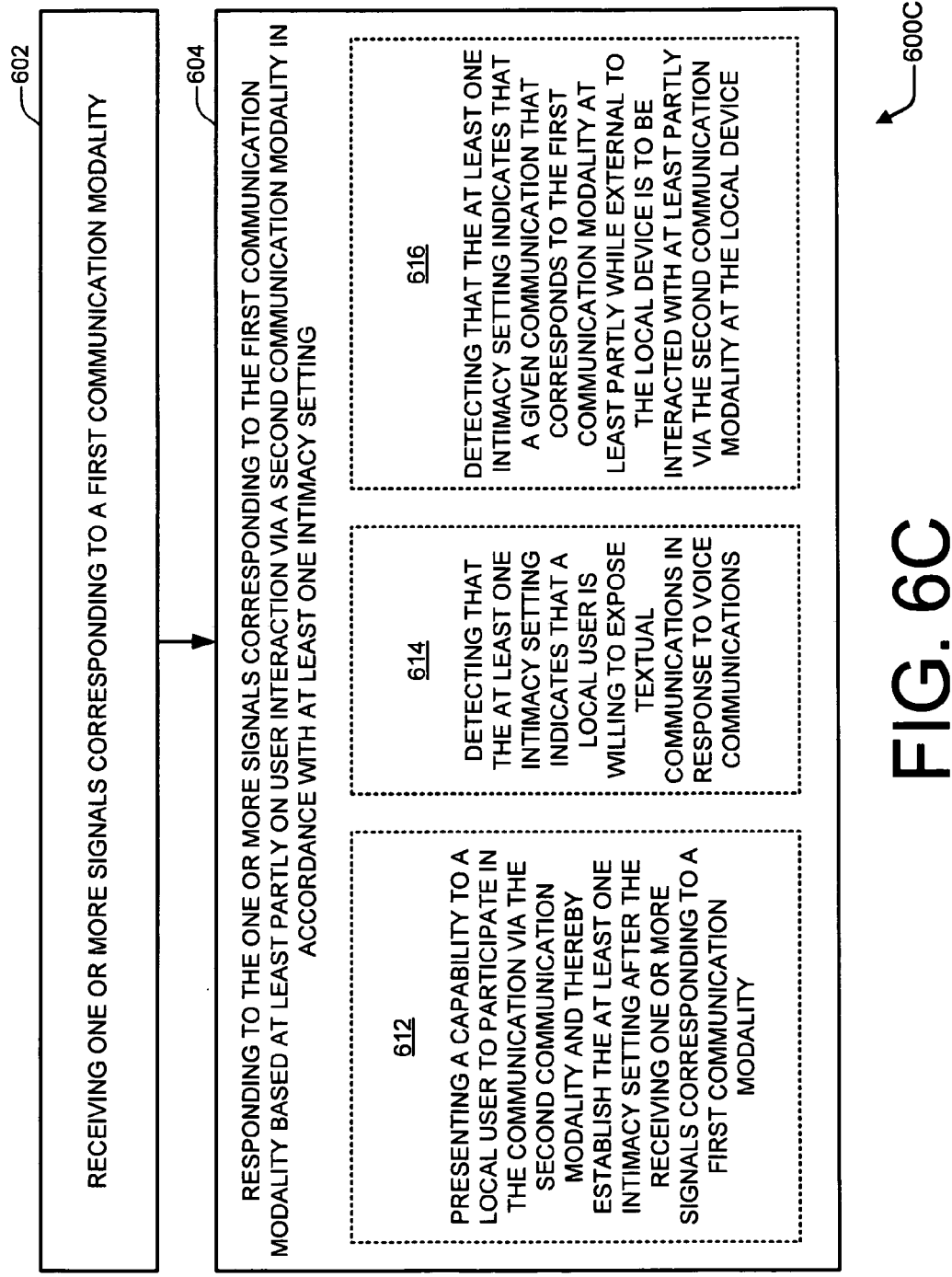

FIG. 6C illustrates example operations 612, 614, and 616. For certain example embodiments, an operation 612 may be directed at least partially to wherein the responding to the one or more signals corresponding to the first communication modality based at least partly on user interaction via a second communication modality in accordance with at least one intimacy setting comprises presenting a capability to a local user to participate in the communication via the second communication modality and thereby establish the at least one intimacy setting after the receiving one or more signals corresponding to a first communication modality. By way of example but not limitation, a local communication device 102L may present a capability to a local user 104L to participate in a communication via a second communication modality 106-2 and thereby establish at least one intimacy setting 204 after the receiving one or more signals corresponding to a first communication modality. For an example implementation, as a communication is initiated or during a communication, a local communication device 102L may present to a local user 104L via a user output interface 516*b* an opportunity to participate in the communication via a second communication modality 106-2. However, claimed subject matter is not limited to any particular described embodiments, implementations, examples, etc.

For certain example embodiments, an operation 614 may be directed at least partially to wherein the responding to the one or more signals corresponding to the first communication modality based at least partly on user interaction via a second communication modality in accordance with at least one intimacy setting comprises detecting that the at least one intimacy setting indicates that a local user is willing to expose textual communications in response to voice communications. By way of example but not limitation, a local communication device 102L may detect that at least one intimacy setting 124 indicates that a local user 104L is willing to expose textual communications in response to voice communications. For example, a local communication device 102L may detect based at least partially on at least one intimacy setting 204 that an incoming voice call is to be responded to using textual input accepted from a local user 104L. However, claimed subject matter is not limited to any particular described embodiments, implementations, examples, etc.

For certain example embodiments, an operation 616 may be directed at least partially to a situation in which at least one intimacy setting is associated with a local device; and wherein the responding to the one or more signals corresponding to the first communication modality based at least partly on user interaction via a second communication modality in accordance with at least one intimacy setting comprises detecting that the at least one intimacy setting indicates that a given communication that corresponds to the first communication modality at least partly while external to the local device is to be interacted with at least partly via the second communication modality at the local device. By way of example but not limitation, a local communication device 102L may detect that at least one intimacy setting 204 indicates that a given communication that corresponds to a first communication modality 106-1 at least partly while external to local communication device 102L is to be interacted with at least partly via a second communication modality 106-2 at local communication device 102L. For an example implementation, for a given communication, a local user 104L may interact with a local communication device 102L via a second communication modality 106-2 although a remote user 104R is interacting with a remote communication device 102R that is participating in the given communication via a first communication modality 106-1. However, claimed subject matter is not limited to any particular described embodiments, implementations, examples, etc.

Figure 6D:
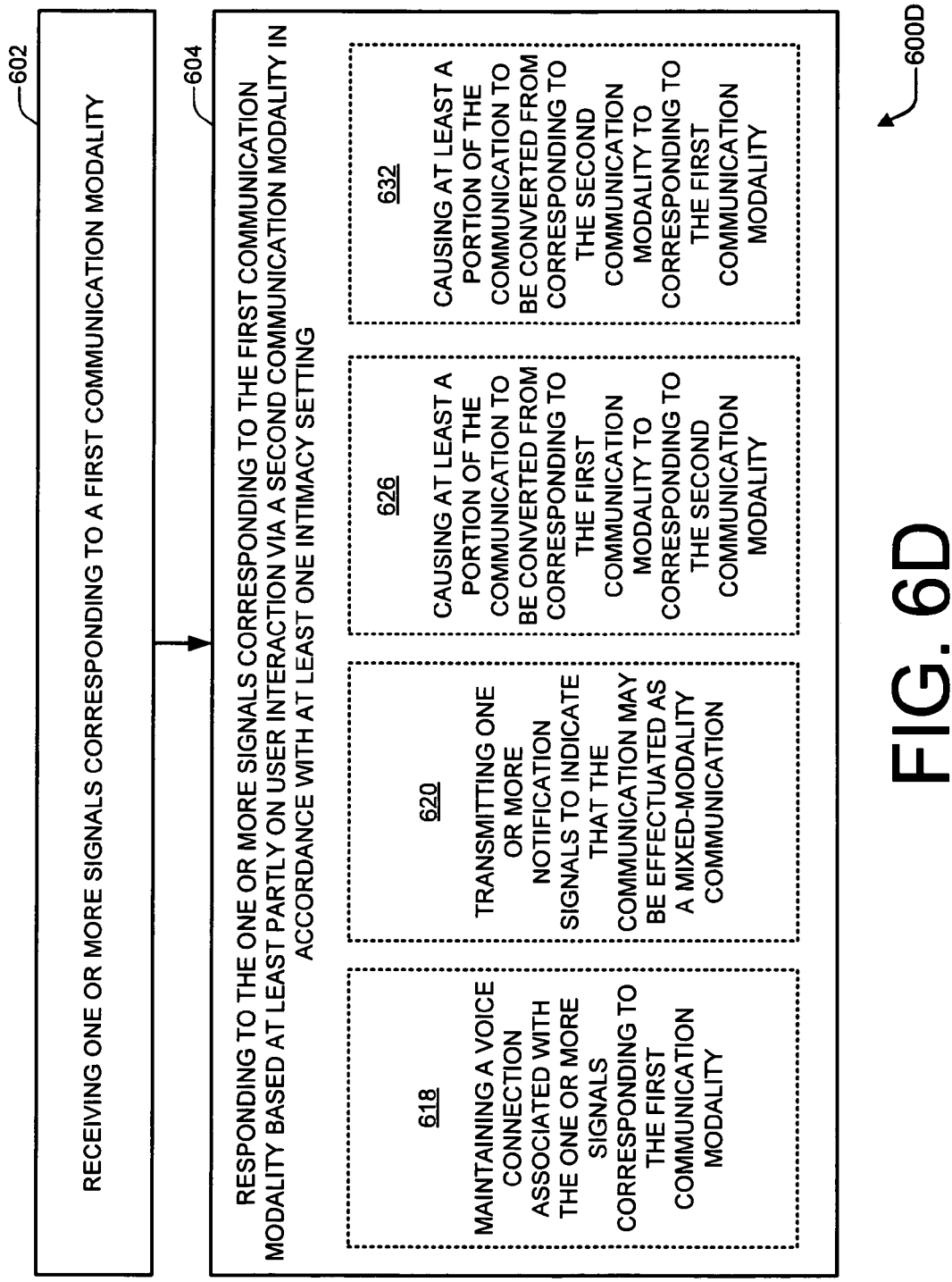

FIG. 6D illustrates example operations 618, 620, 626, and 632. For certain example embodiments, a communication may be conducted wherein the first communication modality comprises voice communication, and the second communication modality comprises textual communication. By way of example but not limitation, a first communication modality 106-1 associated with a remote user 104R may comprise voice communication, and a second communication modality 106-2 associated with a local user 104L may comprise textual communication. However, claimed subject matter is not limited to any particular described embodiments, implementations, examples, etc.

For certain example embodiments, an operation 618 may be directed at least partially to wherein the responding to the one or more signals corresponding to the first communication modality based at least partly on user interaction via a second communication modality in accordance with at least one intimacy setting comprises maintaining a voice connection associated with the one or more signals corresponding to the first communication modality. By way of example but not limitation, a local communication device 102L may maintain a voice connection that is associated with one or more signals 202 corresponding to a first communication modality 106-1. For an example implementation, a voice connection (e.g., a voice call) may be maintained between a local communication device 102L and a remote communication device 102R that are conducting a communication in which a remote user 104R is interacting with remote communication device 102R via a first communication modality 106-1 and a local user 104L is interacting with local communication device 102L via a second communication modality 106-2. However, claimed subject matter is not limited to any particular described embodiments, implementations, examples, etc.

For certain example embodiments, a communication may be conducted wherein the first communication modality and the second communication modality comprise different communication modalities selected from a group of communication modalities comprising: voice communication, textual communication, or video communication. By way of example but not limitation, a communication may be conducted by a local communication device 102L and a remote communication device 102R wherein a first communication modality 106-1 being used by a remote user 104R and a second communication modality 106-2 being used by a local user 104L comprise different communication modalities 106 selected from a group of communication modalities comprising: voice communication, textual communication, or video communication. However, claimed subject matter is not limited to any particular described embodiments, implementations, examples, etc.

For certain example embodiments, an operation 620 may be directed at least partially to wherein the responding to the one or more signals corresponding to the first communication modality based at least partly on user interaction via a second communication modality in accordance with at least one intimacy setting comprises transmitting one or more notification signals to indicate that the communication may be effectuated as a mixed-modality communication. By way of example but not limitation, a local communication device 102L may transmit one or more notification signals to indicate that a communication may be effectuated as a mixed-modality communication. For an example implementation, a local communication device 102L may transmit one or more signals to remote communication device 102R, an intermediate node along channel 108, a combination thereof, etc. providing notification that a communication may be effectuated using at least two communication modalities 106 (e.g., so that remote communication device 102R may notify remote user 104R, may provide remote user 104R with one or more options (e.g., accepting a mixed-modality communication, refusing a mixed-modality communication, canceling the communication, switching to a different communication modality, a combination thereof, etc.), may activate appropriate functionality, some combination thereof, and so forth). However, claimed subject matter is not limited to any particular described embodiments, implementations, examples, etc.

Figure 6E:
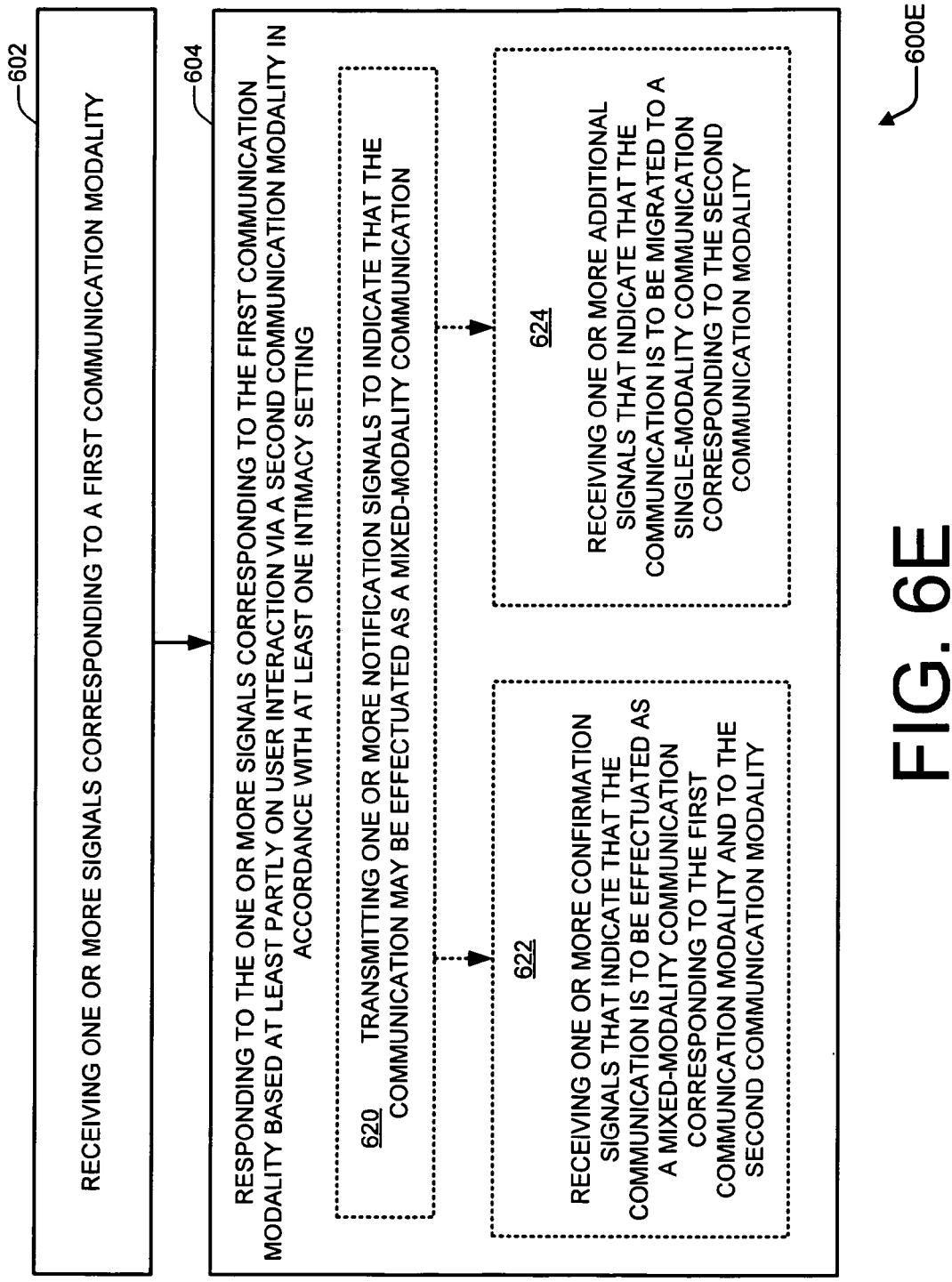

FIG. 6E illustrates example operations 622 and 624, in conjunction with operation 620. For certain example embodiments, an operation 622 may be directed at least partially to wherein the responding to the one or more signals corresponding to the first communication modality based at least partly on user interaction via a second communication modality in accordance with at least one intimacy setting further comprises (e.g., in addition to operation 620) receiving one or more confirmation signals that indicate that the communication is to be effectuated as a mixed-modality communication corresponding to the first communication modality and to the second communication modality. By way of example but not limitation, a local communication device 102L may receive one or more confirmation signals that indicate that a communication between local communication device 102L and remote communication device 102R is to be effectuated as a mixed-modality communication corresponding to a first communication modality 106-1 and to a second communication modality 106-2. For an example implementation, a local communication device 102L may receive one or more signals via a channel 108 that confirm that a remote user 104R has accepted a mixed-modality communication or that confirm that an intermediate node has established functionality to support a mixed-modality communication. However, claimed subject matter is not limited to any particular described embodiments, implementations, examples, etc.

For certain example embodiments, an operation 624 may be directed at least partially to wherein the responding to the one or more signals corresponding to the first communication modality based at least partly on user interaction via a second communication modality in accordance with at least one intimacy setting further comprises (e.g., in addition to operation 620) receiving one or more additional signals that indicate that the communication is to be migrated to a single-modality communication corresponding to the second communication modality. By way of example but not limitation, a local communication device 102L may receive one or more additional signals that indicate that a communication is to be migrated to a single-modality communication corresponding to a second communication modality 106-2. For an example implementation, a local communication device 102L may receive one or more signals via a channel 108 that indicate that a remote user 104R has elected to migrate a communication to a single-modality communication corresponding to a second communication modality 106-2 as selected by a local user 104L or indicated by at least one intimacy setting 204 or that indicate that an intermediate node has migrated or is prepared to migrate a communication. However, claimed subject matter is not limited to any particular described embodiments, implementations, examples, etc.

For certain example embodiments, an operation 626 (e.g., of FIG. 6D) may be directed at least partially to wherein the responding to the one or more signals corresponding to the first communication modality based at least partly on user interaction via a second communication modality in accordance with at least one intimacy setting comprises causing at least a portion of the communication to be converted from corresponding to the first communication modality to corresponding to the second communication modality. By way of example but not limitation, a local communication device 102L may cause at least a portion of a communication to be converted from corresponding to a first communication modality 106-1 to corresponding to a second communication modality 106-2 (e.g., using a conversion effectuator 402 (e.g., of FIG. 4A)). For an example implementation, a conversion may be caused to be effectuated with respect to one or more signals arriving from remote communication device 102R. However, claimed subject matter is not limited to any particular described embodiments, implementations, examples, etc.

FIG. 6F illustrates example operations 628, 630a, and 630b; and 634, 636a, and 636b, in conjunction with operations 626 and 632, respectively. For certain example embodiments, an operation 628 may be directed at least partially to wherein the causing at least a portion of the communication to be converted from corresponding to the first communication modality to corresponding to the second communication modality (e.g., of operation 626) comprises converting at least the portion of the communication from corresponding to the first communication modality to corresponding to the second communication modality. By way of example but not limitation, a local communication device 102L may convert at least a portion of a communication from corresponding to a first communication modality 106-1 to corresponding to a second communication modality 106-2 (e.g., using a converter 404 (e.g., of FIG. 4B)). However, claimed subject matter is not limited to any particular described embodiments, implementations, examples, etc.

For certain example embodiments, an operation 630a or 630b may be directed at least partially to wherein the causing at least a portion of the communication to be converted from corresponding to the first communication modality to corresponding to the second communication modality (e.g., of operation 626) comprises initiating transmission of at least the portion of the communication corresponding to the first communication modality to a conversion node or receiving at least the portion of the communication corresponding to the second communication modality from the conversion node, respectively. By way of example but not limitation, a local communication device 102L may initiate transmission of at least a portion of a communication corresponding to a first communication modality 106-1 to a conversion node 408 and may receive at least the portion of the communication corresponding to a second communication modality 106-2 from conversion node 408 (e.g., using a conversion requestor 406 (e.g., of FIG. 4C)). However, claimed subject matter is not limited to any particular described embodiments, implementations, examples, etc.

For certain example embodiments, an operation 632 (e.g., of FIG. 6D) may be directed at least partially to wherein the responding to the one or more signals corresponding to the first communication modality based at least partly on user interaction via a second communication modality in accordance with at least one intimacy setting comprises causing at least a portion of the communication to be converted from corresponding to the second communication modality to corresponding to the first communication modality. By way of example but not limitation, a local communication device 102L may cause at least a portion of a communication to be converted from corresponding to a second communication modality 106-2 to corresponding to a first communication modality 106-1 (e.g., using a conversion effectuator 402 (e.g., of FIG. 4A)). For an example implementation, a conversion may be caused to be effectuated with respect to one or more signals generated by a user input interface 516a prior to their being transmitted to a remote communication device 102R. However, claimed subject matter is not limited to any particular described embodiments, implementations, examples, etc.

For certain example embodiments, an operation 634 (e.g., of FIG. 6F) may be directed at least partially to wherein the causing at least a portion of the communication to be converted from corresponding to the second communication modality to corresponding to the first communication modality (e.g., of operation 632) comprises converting at least the portion of the communication from corresponding to the second communication modality to corresponding to the first communication modality. By way of example but not limitation, a local communication device 102L may convert at least a portion of a communication from corresponding to a second communication modality 106-2 to corresponding to a first communication modality 106-1 (e.g., using a converter 404 (e.g., of FIG. 4B)). However, claimed subject matter is not limited to any particular described embodiments, implementations, examples, etc.

For certain example embodiments, an operation 636a or 636b may be directed at least partially to wherein the causing at least a portion of the communication to be converted from corresponding to the second communication modality to corresponding to the first communication modality (e.g., of operation 632) comprises initiating transmission of at least the portion of the communication corresponding to the second communication modality to a conversion node or receiving at least the portion of the communication corresponding to the first communication modality from the conversion node, respectively. By way of example but not limitation, a local communication device 102L may initiate transmission of at least a portion of a communication corresponding to a second communication modality 106-2 to a conversion node 408 and may receive at least the portion of the communication corresponding to a first communication modality 106-1 from conversion node 408 (e.g., using a conversion requester 406 (e.g., of FIG. 4C)). However, claimed subject matter is not limited to any particular described embodiments, implementations, examples, etc.

Figure 6G:
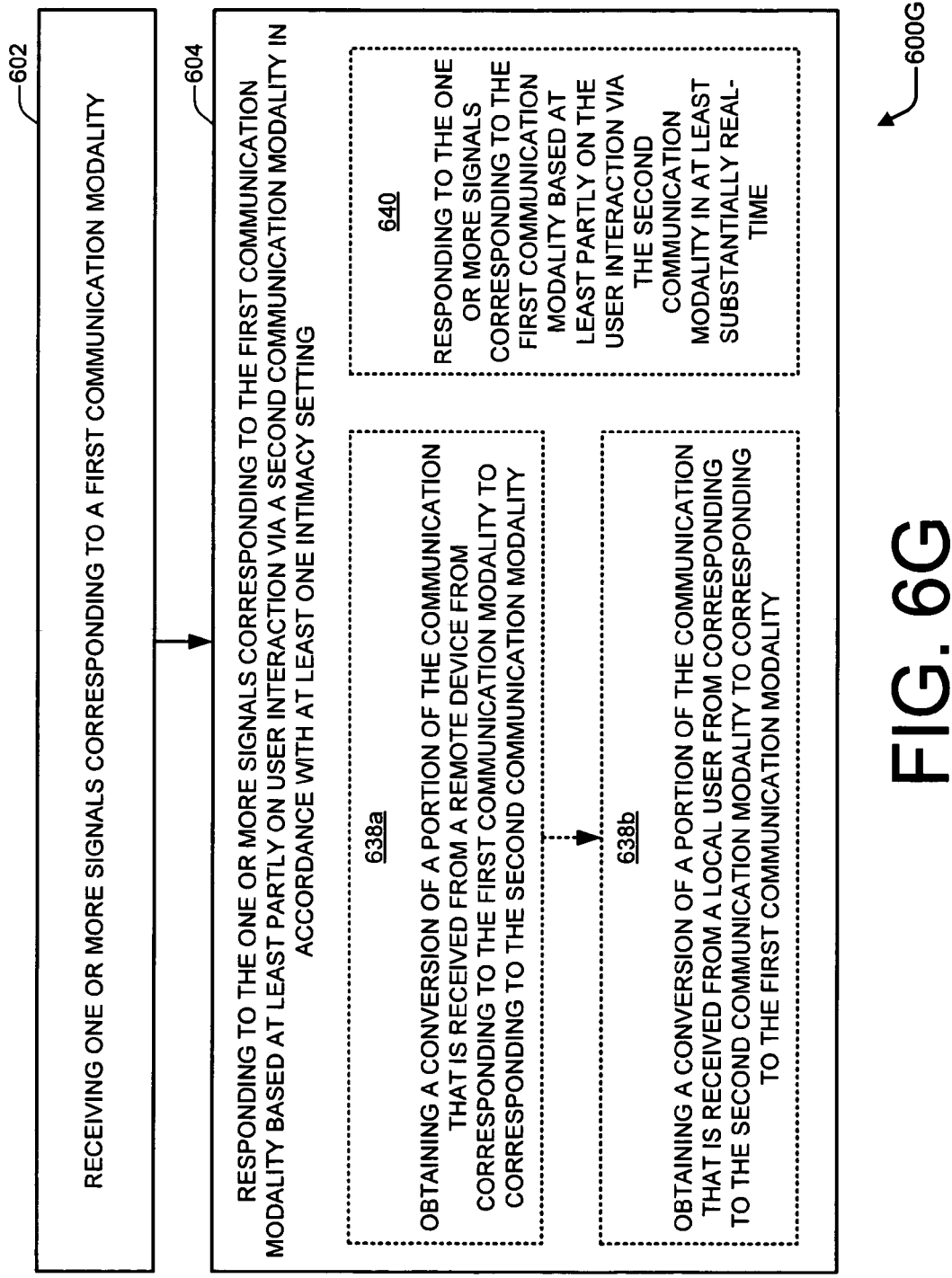

FIG. 6G illustrates example operations 638a, 638b, and 640. For certain example embodiments, an operation 638a or 638b may be directed at least partially to wherein the responding to the one or more signals corresponding to the first communication modality based at least partly on user interaction via a second communication modality in accordance with at least one intimacy setting comprises obtaining a conversion of a portion of the communication that is received from a remote device from corresponding to the first communication modality to corresponding to the second communication modality or obtaining a conversion of a portion of the communication that is received from a local user from corresponding to the second communication modality to corresponding to the first communication modality, respectively. By way of example but not limitation, a local communication device 102L may obtain a conversion of a portion of a communication that is received from a remote communication device 102R from corresponding to a first communication modality 106-1 to corresponding to a second communication modality 106-2 and may obtain a conversion of a portion of the communication that is received from a local user 104L from corresponding to second communication modality 106-2 to corresponding to first communication modality 106-1. For an example implementation, a local communication device 102L may obtain conversions of communication portion(s) automatically (e.g., from a conversion node 408), responsive to an initial request for conversion services (e.g., from a conversion node 408 due at least in part to conversion requester 406), responsive to repeated or on-demand requests for conversion services (e.g., from a conversion node 408 due at least in part to conversion requester 406) as communication portions are received or are generated, locally (e.g., from a converter 404), any combination thereof, and so forth. However, claimed subject matter is not limited to any particular described embodiments, implementations, examples, etc.

For certain example embodiments, an operation 640 may be directed at least partially to wherein the responding to the one or more signals corresponding to the first communication modality based at least partly on user interaction via a second communication modality in accordance with at least one intimacy setting comprises responding to the one or more signals corresponding to the first communication modality based at least partly on the user interaction via the second communication modality in at least substantially real-time. By way of example but not limitation, a local communication device 102L may respond to one or more signals 202 corresponding to a first communication modality 106-1 based at least partly on local user 104L interaction via a second communication modality 106-2 in at least substantially real-time. For an example implementation, a response may be considered to be made in substantially real-time if a related conversational flow may be continued without introducing significant person-perceptible delay(s), at least not in addition to those introduced by e.g. one participant entering text if another participant is interacting with voice. However, claimed subject matter is not limited to any particular described embodiments, implementations, examples, etc.

Figure 6H:
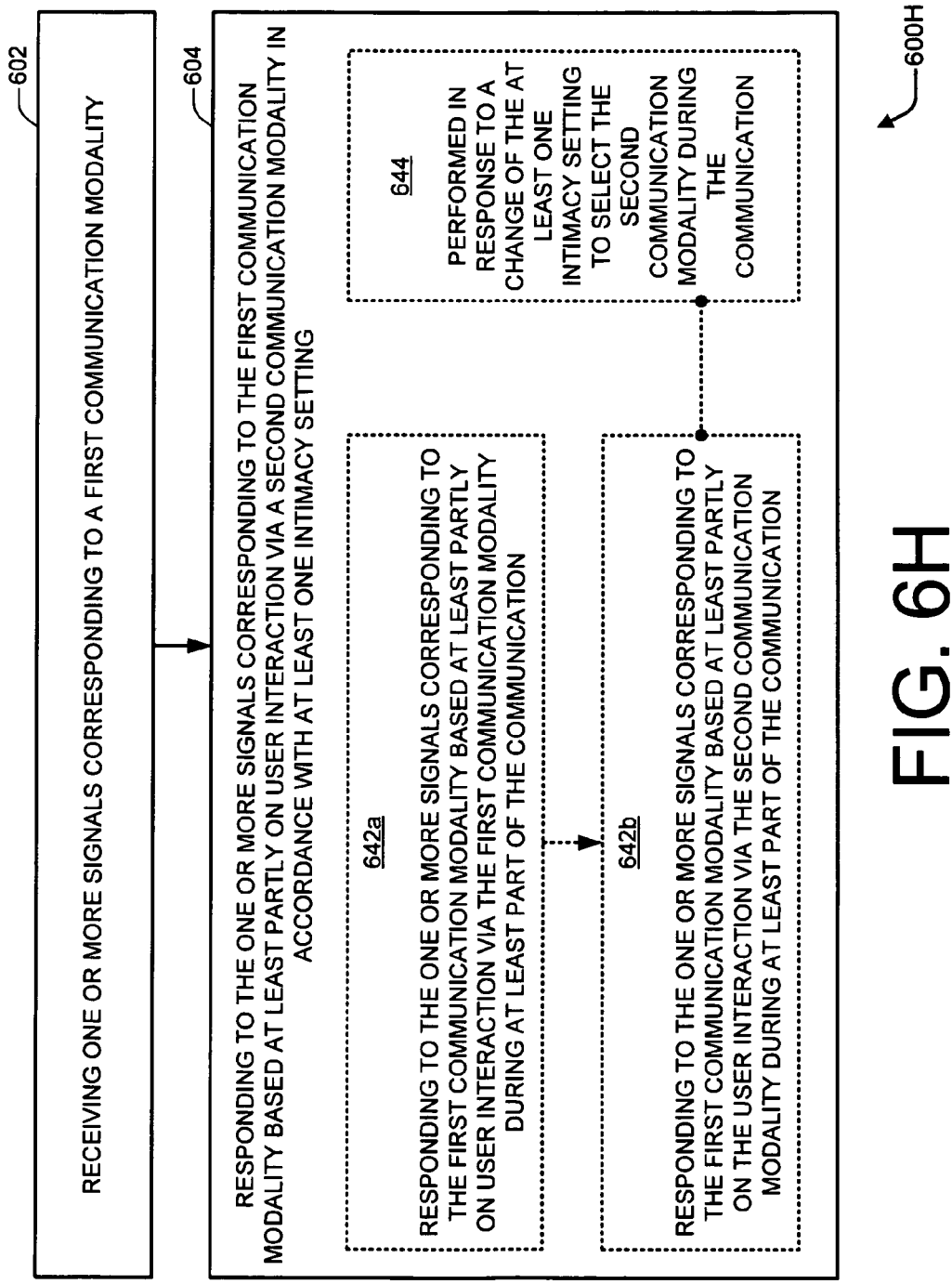

FIG. 6H illustrates example operations 642a, 642b, and 644. For certain example embodiments, an operation 642a or 642b may be directed at least partially to wherein the responding to the one or more signals corresponding to the first communication modality based at least partly on user interaction via a second communication modality in accordance with at least one intimacy setting comprises responding to the one or more signals corresponding to the first communication modality based at least partly on user interaction via the first communication modality during at least part of the communication or responding to the one or more signals corresponding to the first communication modality based at least partly on the user interaction via the second communication modality during at least part of the communication, respectively. By way of example but not limitation, a local communication device 102L may respond to one or more signals 202 corresponding to a first communication modality 106-1 based at least partly on local user 104L interaction via a first communication modality 106-1 during at least part of a communication and may respond to one or more signals 202 corresponding to first communication modality 106-1 based at least partly on local user 104L interaction via a second communication modality 106-2 during at least part of the communication. For an example implementation, a local user 104L may interact with a local communication device 102L via a first communication modality 106-1 (e.g., voice) at one point in a communication and may interact with local communication device 102L via a second communication modality 106-2 (e.g., text) at another point in the communication. However, claimed subject matter is not limited to any particular described embodiments, implementations, examples, etc.

For certain example embodiments, an operation 644 may be directed at least partially to a situation wherein the responding to the one or more signals corresponding to the first communication modality based at least partly on the user interaction via the second communication modality during at least part of the communication is performed in response to a change of the at least one intimacy setting to select the second communication modality during the communication. By way of example but not limitation, a local communication device 102L may respond to one or more signals 202 corresponding to first communication modality 106-1 based at least partly on local user 104L interaction via a second communication modality 106-2 during at least part of a communication in response to a change of at least one intimacy setting 204 to select second communication modality 106-2 during the communication. For an example implementation, a local user 104L may be empowered to switch form interacting with a local communication device 102L via a first communication modality 106-1 to interacting via a second communication modality 106-2 during a communication by adjusting at least one intimacy setting 204 (e.g., via a user input interface 516a) during the communication. However, claimed subject matter is not limited to any particular described embodiments, implementations, examples, etc.

Figure 6I:
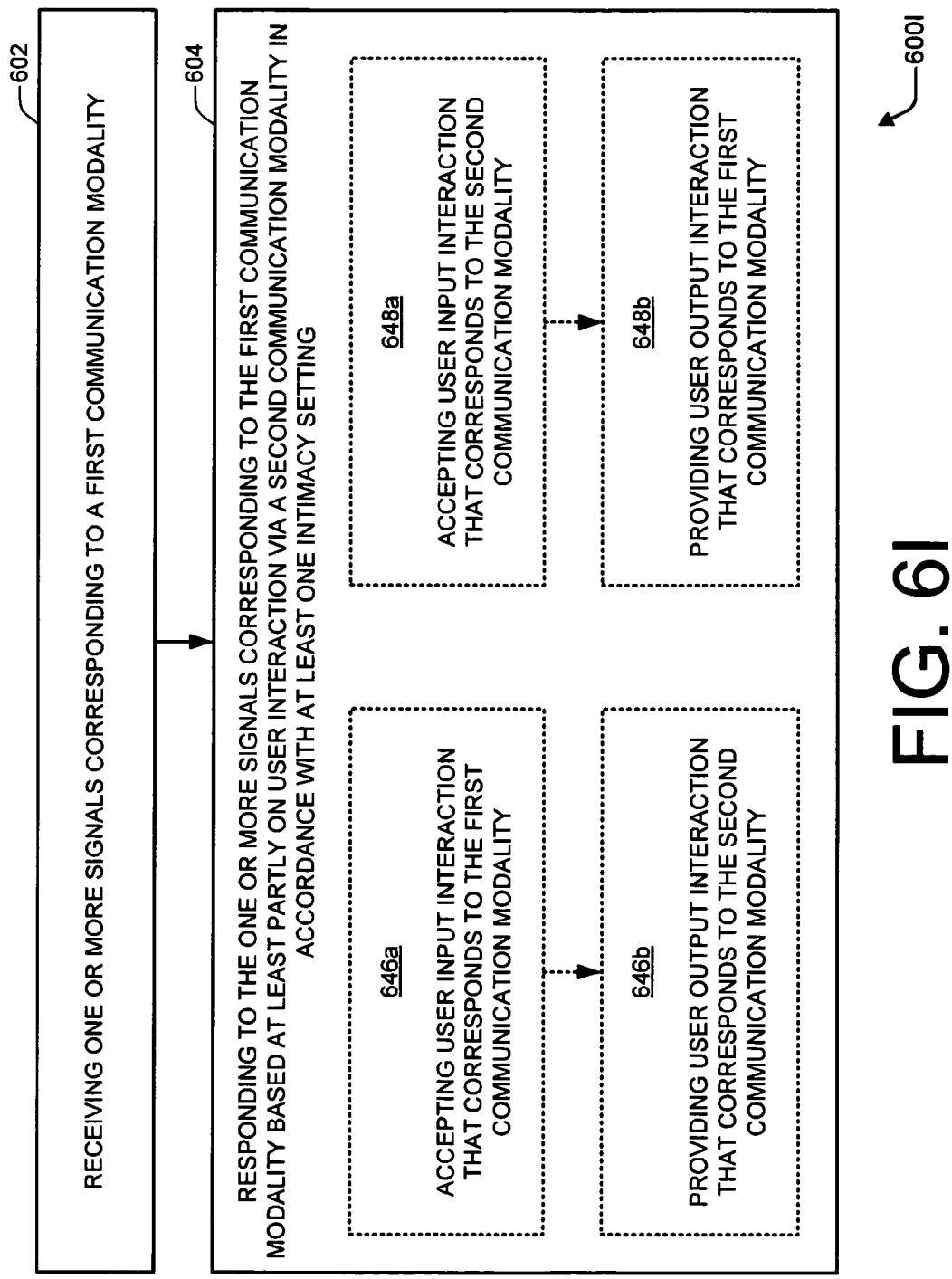

FIG. 6I illustrates example operations 646a, 646b, 648a, and 648b. For certain example embodiments, an operation 646a or 646b may be directed at least partially to wherein the responding to the one or more signals corresponding to the first communication modality based at least partly on user interaction via a second communication modality in accordance with at least one intimacy setting comprises accepting user input interaction that corresponds to the first communication modality or providing user output interaction that corresponds to the second communication modality, respectively. By way of example but not limitation, a local communication device 102L may accept local user 104L input interaction that corresponds to a first communication modality 106-1 (e.g., which may also be being used by a remote user 104R) and may provide local user 104L output interaction that corresponds to a second communication modality 106-2 (e.g., which may not also be being used by a remote user 104R). For an example implementation, a local communication device 102L may accept e.g. voice input from a local user 104L and may provide e.g. text output to a local user 104L for a given communication. However, claimed subject matter is not limited to any particular described embodiments, implementations, examples, etc.

For certain example embodiments, an operation 648a or 648b may be directed at least partially to wherein the responding to the one or more signals corresponding to the first communication modality based at least partly on user interaction via a second communication modality in accordance with at least one intimacy setting comprises accepting user input interaction that corresponds to the second communication modality or providing user output interaction that corresponds to the first communication modality, respectively. By way of example but not limitation, a local communication device 102L may accept local user 104L input interaction that corresponds to a second communication modality 106-2 (e.g., which may not also be being used by a remote user 104R) and may provide local user 104L output interaction that corresponds to a first communication modality 106-1 (e.g., which may also be being used by a remote user 104R). For an example implementation, a local communication device 102L may accept e.g. text input from a local user 104L and may provide e.g. voice output to a local user 104L for a given communication. However, claimed subject matter is not limited to any particular described embodiments, implementations, examples, etc.

For certain example embodiments, a situation may exist in which the at least one intimacy setting represents at least one degree of communicative exposure that a local user may establish for a local device. By way of example but not limitation, at least one intimacy setting 204 may represent at least one degree of communicative exposure that a local user 104L may establish for a local communication device 102L. For an example implementation, at least one intimacy setting 204 may represent if a local user 104L wishes to expose textual communication, voice communication, video communication, a combination thereof, and so forth. However, claimed subject matter is not limited to any particular described embodiments, implementations, examples, etc.

For certain example embodiments, a situation may exist in which the at least one intimacy setting indicates that a local user is to interact with an incoming voice call via a textual user interface of a local device. By way of example but not limitation, at least one intimacy setting 204 may indicate that a local user 104L is to interact with an incoming voice call via a textual user interface 516 of a local communication device 102L. However, claimed subject matter is not limited to any particular described embodiments, implementations, examples, etc.

FIG. 6J illustrates example operations 650, 650a, and 650b. For certain example embodiments, a situation in accordance with operation 650 may exist wherein the first communication modality comprises voice communication, and the second communication modality comprises textual communication. By way of example but not limitation, a first communication modality 106-1 may comprise voice communication, and a second communication modality 106-2 may comprise textual communication. Furthermore, an operation 650a or 650b may be directed at least partially to wherein the responding to the one or more signals corresponding to the first communication modality based at least partly on user interaction via a second communication modality in accordance with at least one intimacy setting comprises detecting responsive at least partly to the at least one intimacy setting that a voice connection associated with the one or more signals corresponding to the voice communication is to be effectuated at least partially using textual input or maintaining the voice connection associated with the one or more signals corresponding to the voice communication, respectively. By way of example but not limitation, a local communication device 102L may detect, responsive at least partly to at least one intimacy setting 204, that a voice connection associated with one or more signals 202 corresponding to a voice communication is to be effectuated at least partially using textual input and may maintain the voice connection associated with the one or more signals 202 corresponding to the voice communication. However, claimed subject matter is not limited to any particular described embodiments, implementations, examples, etc.

FIG. 6K illustrates example operations 652*a*, 652*b*, and 652*c*; and 654*a*, 654*b*, and 654*c*, which may relate to operations 650*a*, 650*b*, and 650*c*. For certain example embodiments, an operation 652*a* or 652*b* or 652*c* may be directed at least partially to wherein the responding to the one or more signals corresponding to the first communication modality based at least partly on user interaction via a second communication modality in accordance with at least one intimacy setting further comprises (e.g., in addition to operations 650*a*, 650*b*, and 650*c*) accepting user text input as text data or causing the text data to be converted to voice data or transmitting the voice data as part of the voice connection, respectively. By way of example but not limitation, a local communication device 102L may accept local user 104L text input as text data, may cause the text data to be converted to voice data (e.g., using a conversion effectuator 402 (e.g., of FIG. 4A)), and may transmit the voice data as part of a maintained voice connection (e.g., to remote communication device 102R). However, claimed subject matter is not limited to any particular described embodiments, implementations, examples, etc.

For certain example embodiments, an operation 654*a* or 654*b* or 654*c* may be directed at least partially to wherein the responding to the one or more signals corresponding to the first communication modality based at least partly on user interaction via a second communication modality in accordance with at least one intimacy setting further comprises (e.g., in addition to operations 650*a*, 650*b*, 650*c*, 652*a*, 652*b*, and 652*c*) receiving additional voice data as part of the voice connection or causing the additional voice data to be converted to additional text data or presenting the additional text data as text output, respectively. By way of example but not limitation, a local communication device 102L may receive additional voice data as part of a maintained voice connection (e.g., from a remote communication device 102R), may cause the additional voice data to be converted to additional text data (e.g., with a conversion effectuator 402 (e.g., of FIG. 4A)), and may present the additional text data as text output (e.g., to a local user 104L). However, claimed subject matter is not limited to any particular described embodiments, implementations, examples, etc.

It should be appreciated that the particular embodiments (e.g., processes, apparatuses, systems, media, arrangements, etc.) described herein are merely possible implementations of the present disclosure, and that the present disclosure is not limited to the particular implementations described herein or shown in the accompanying figures.

In addition, in alternative implementations, certain acts, operations, etc. need not be performed in the order described, and they may be modified and/or may be omitted entirely, depending on the circumstances. Moreover, in various implementations, the acts or operations described may be implemented by a computer, controller, processor, programmable device, or any other suitable device, and may be based on instructions stored on one or more computer-readable or processor-accessible media or otherwise stored or programmed into such devices. If computer-readable media are used, the computer-readable media may be, by way of example but not limitation, any available media that can be accessed by a device to implement the instructions stored thereon.

Various methods, systems, techniques, etc. have been described herein in the general context of processor-executable instructions, such as program modules, executed by one or more processors or other devices. Generally, program modules may include routines, programs, objects, components, data structures, combinations thereof, etc. that perform particular tasks or implement particular abstract data types. Typically, functionality of program modules may be combined or distributed as desired in various alternative embodiments. In addition, embodiments of methods, systems, techniques, etc. may be stored on or transmitted across some form of device-accessible media.

It may also be appreciated that there may be little distinction between hardware implementations and software implementations for aspects of systems, methods, etc. that are disclosed herein. Use of hardware or software may generally be a design choice representing cost vs. efficiency tradeoffs, for example. However, in certain contexts, a choice between hardware and software (e.g., for an entirety or a given portion of an implementation) may become significant. Those having skill in the art will appreciate that there are various vehicles by which processes, systems, technologies, etc. described herein may be effected (e.g., hardware, software, firmware, combinations thereof, etc.), and that a preferred vehicle may vary depending upon a context in which the processes, systems, technologies, etc. are deployed. For example, if an implementer determines that speed and accuracy are paramount, an implementer may opt for a mainly hardware and/or firmware vehicle. Alternatively, if flexibility is deemed paramount, an implementer may opt for a mainly software implementation. In still other implementations, an implementer may opt for some combination of hardware, software, and/or firmware. Hence, there are multiple possible vehicles by which processes and/or devices and/or other technologies described herein may be effected. Which vehicle may be desired over another may be a choice dependent upon a context in which a vehicle is to be deployed or specific concerns (e.g., speed, flexibility, predictability, etc.) of an implementer, any of which may vary. Those skilled in the art will recognize that optical aspects of example implementations may employ optically-oriented hardware, software, and/or firmware.

Those skilled in the art will recognize that it is common within the art to describe devices and/or processes in fashion(s) as set forth herein, and thereafter use standard engineering practices to realize such described devices and/or processes into workable systems having described functionality. That is, at least a portion of the devices and/or processes described herein may be realized via a reasonable amount of experimentation.

Aspects and drawings described herein illustrate different components contained within, or connected with, other different components. It is to be understood that such depicted architectures are presented merely by way of example, and that many other architectures may be implemented to achieve identical or similar functionality. In a conceptual sense, any arrangement of components to achieve described functionality may be considered effectively "associated" such that desired functionality is achieved. Hence, any two or more components herein combined to achieve a particular functionality may be seen as "associated with" each other such that desired functionality is achieved, irrespective of architectures or intermedial components. Likewise, any two or more components so associated can also be viewed as being "operably connected" or "operably coupled" (or "operatively connected," or "operatively coupled") to each other to achieve desired functionality, and any two components capable of being so associated can also be viewed as being "operably couplable" (or "operatively couplable") to each other to achieve desired functionality. Specific examples of operably couplable include, but are not limited to, physically mateable and/or physically interacting components and/or wirelessly interactable and/or wirelessly interacting components and/or logically interacting and/or logically interactable components.

Those skilled in the art will recognize that at least some aspects of embodiments disclosed herein may be implemented at least partially via integrated circuits (ICs), as one or more computer programs running on one or more computing devices, as one or more software programs running on one or more processors, as firmware, as any combination thereof, and so forth. It will be further understood that designing circuitry and/or writing code for software and/or firmware may be accomplished by a person skilled in the art in light of the teachings and explanations of this disclosure.

The foregoing detailed description has set forth various example embodiments of devices and/or processes via the use of block diagrams, flowcharts, examples, combinations thereof, etc. Insofar as such block diagrams, flowcharts, examples, combinations thereof, etc. may contain or represent one or more functions and/or operations, it will be understood by those within the art that each function and/or operation within such block diagrams, flowcharts, examples, combination thereof, etc. may be implemented, individually and/or collectively, by a wide range of hardware, software, firmware, any combination thereof, and so forth. For example, in some embodiments, one or more portions of subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of example embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, as virtually any combination thereof, etc. and that designing circuitry and/or writing code for software and/or firmware is within the skill of one of skill in the art in light of the teachings of this disclosure.

In addition, those skilled in the art will appreciate that the mechanisms of subject matter described herein are capable of being distributed as a program product in a variety of forms, and that an illustrative embodiment of subject matter described herein applies regardless of a particular type of signal-bearing media used to actually carry out the distribution. Examples of a signal-bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

Although particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that inventive subject matter is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two item," without other modifiers, typically means at least two recitations, or two or more recitations).

As a further example of "open" terms in the present specification including the claims, it will be understood that usage of a language construction of "A or B" is generally interpreted, unless context dictates otherwise, as a non-exclusive "open term" meaning: A alone, B alone, and/or A and B together. Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

Although various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
   (A) circuitry for receiving one or more signals corresponding to a first communication modality, the one or more signals indicative of one or more transmissions from a device that is remote to a user ("remote device"); and
   (B) circuitry for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions, including at least:
      (1) circuitry for receiving a user selection of the user preferred communication modality for interacting with the local device;
      (2) circuitry for causing at least a portion of a communication to be converted from corresponding to the first communication modality to corresponding to the second communication modality, including at least:
         (a) circuitry for initiating transmission away from the local device and to at least one conversion node at least the portion of the communication corresponding to the first communication modality for conversion at the at least one conversion node from corresponding to the first communication modality to corresponding to the second communication modality, wherein the at least one conversion node is external to the local device and includes at least one of a telecommunications node or an Internet node; and
         (b) circuitry for receiving from the at least one conversion node as converted data at least the portion of the communication corresponding to the second communication modality, the circuitry for receiving configured to at least one of receive at least the portion of the communication at the local device or to receive and forward at least the portion of the communication toward the local device;
      (3) circuitry for responding to the one or more signals corresponding to the first communication modality based at least partly on user interaction with the local device via a second communication modality in accordance with at least one intimacy setting that indicates a user preferred communication modality for interacting with the local device based at least partly upon an identity of a remote user associated with the remote device, wherein the at least one intimacy setting indicates a user preferred communication modality selected from at least two communication modalities for interacting with the local device during at least a portion of a communication;
      (4) circuitry for responding to the one or more signals corresponding to the first communication modality based at least partly on user interaction with the local device via a second communication modality in accordance with at least one intimacy setting, wherein the at least one intimacy setting indicates that if a remote communication modality for at least a portion of a communication is at least partly the first communication modality then the local communication modality for user interaction with the local device for at least the portion of the communication shall be at least partly via the second communication modality, the first and the second communication modalities being different communication modalities and wherein the circuitry for responding is configured to ascertain the intimacy setting at least partly from a user selection stored before the communication and is further configured to, at the time of the communication, select the second communication modality based at least in part on a determination that the remote communication modality for at least the portion of the communication is at least partly the first communication modality and based at least in part on the ascertained intimacy setting; and
      (5) circuitry for transmitting one or more notification signals from the local device to the remote device indicating that at least a portion of the communication may be effectuated as a mixed-modality communication, wherein the one or more notification signals are configured to facilitate the remote device in presenting at least partly via a user interface one or more options that include at least one of accepting the mixed-modality communication, refusing the mixed-modality communication, cancelling the communication or changing communication modalities and wherein the one or more notification signals include at least other than the communication itself.

2. The system of claim 1, wherein the circuitry for receiving one or more signals corresponding to a first communication modality comprises:
   circuitry for receiving the one or more signals from a remote device that initiated the communication, the one or more signals being associated with the communication.

3. The system of claim 1, wherein the circuitry for receiving one or more signals corresponding to a first communication modality comprises:
   circuitry for receiving the one or more signals at a local device that initiated the communication, the one or more signals being associated with the communication.

4. The system of claim 1, wherein the circuitry for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions comprises:
   circuitry for ascertaining the at least one intimacy setting from a user selection that was stored prior to receipt of the one or more signals corresponding to the first communication modality.

5. The system of claim 1, wherein the circuitry for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions comprises:
   circuitry for detecting that the at least one intimacy setting indicates that a local user, subject to one or more conditions, is willing to expose textual communications in response to voice communications.

6. The system of claim 1, wherein the first communication modality and the second communication modality include at least different communication modalities with (i) the first communication modality including at least one of voice communication, textual communication, or video communication and (ii) the second communication modality including at least one of voice communication, textual communication, or video communication.

7. The system of claim 1, wherein the circuitry for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions comprises:
  circuitry for receiving one or more confirmation signals that indicate that the communication is to be effectuated as a mixed-modality communication corresponding to the first communication modality and to the second communication modality.

8. The system of claim 1, wherein the circuitry for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions comprises:
  circuitry for receiving one or more additional signals from the remote device that indicate that the communication is to be migrated to a single-modality communication corresponding to the second communication modality.

9. The system of claim 1, wherein the circuitry for causing at least a portion of a communication to be converted from corresponding to the first communication modality to corresponding to the second communication modality comprises:
  circuitry for converting at least a portion of the communication from corresponding to the first communication modality to corresponding to the second communication modality.

10. The system of claim 1, wherein the circuitry for causing at least a portion of a communication to be converted from corresponding to the first communication modality to corresponding to the second communication modality comprises:
  circuitry for causing at least another portion of the communication to be converted from corresponding to the second communication modality to corresponding to the first communication modality.

11. The system of claim 10, wherein the circuitry for causing at least another portion of the communication to be converted from corresponding to the second communication modality to corresponding to the first communication modality comprises:
  circuitry for converting at least the other portion of the communication from corresponding to the second communication modality to corresponding to the first communication modality.

12. The system of claim 10, wherein the circuitry for causing at least another portion of the communication to be converted from corresponding to the second communication modality to corresponding to the first communication modality comprises:
  circuitry for initiating transmission of at least the other portion of the communication corresponding to the second communication modality to at least one conversion node; and
  circuitry for receiving at least the other portion of the communication corresponding to the first communication modality from the at least one conversion node.

13. The system of claim 1, wherein the circuitry for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions comprises:
  circuitry for obtaining a conversion of a portion of the communication that is received from a remote device from corresponding to the first communication modality to corresponding to the second communication modality; and
  circuitry for obtaining a conversion of a portion of the communication that is received from a local user from corresponding to the second communication modality to corresponding to the first communication modality.

14. The system of claim 1, wherein the circuitry for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions comprises:
  circuitry for responding to the one or more signals corresponding to the first communication modality based at least partly on user interaction via the second communication modality in at least substantially real-time.

15. The system of claim 1, wherein the circuitry for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions comprises:
  circuitry for responding to the one or more signals corresponding to the first communication modality based at least partly on user interaction via the first communication modality during at least part of the communication; and
  circuitry for responding to the one or more signals corresponding to the first communication modality based at least partly on user interaction via the second communication modality during at least part of the communication.

16. The system of claim 15, wherein the circuitry for responding to the one or more signals corresponding to the first communication modality based at least partly on user interaction via the second communication modality during at least part of the communication operates in response to a change during the communication of the at least one intimacy setting that is selective of the second communication modality.

17. The system of claim 1, wherein the circuitry for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions comprises:
- circuitry for accepting user input interaction that corresponds to the first communication modality; and
- circuitry for providing user output interaction that corresponds to the second communication modality responsive at least partly to a joint input-output interaction selection of the at least one intimacy setting.

18. The system of claim 1, wherein the circuitry for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions comprises:
- circuitry for accepting user input interaction that corresponds to the second communication modality; and
- circuitry for providing user output interaction that corresponds to the first communication modality.

19. The system of claim 1, wherein the at least one intimacy setting is representative of at least one degree of communicative exposure that a local user may establish for a local device.

20. The system of claim 1, wherein the at least one intimacy setting is indicative that a local user is to interact with an incoming voice call via a textual user interface of a local device.

21. The system of claim 1, wherein the circuitry for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions comprises:
- circuitry for presenting a capability to a local user to participate in the communication via the second communication modality and thereby establish the at least one intimacy setting after receipt of the one or more signals corresponding to the first communication modality.

22. The system of claim 1, wherein the at least one intimacy setting is associated with the local device; and wherein the circuitry for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions comprises:
- circuitry for detecting that the at least one intimacy setting is indicative that a given communication that corresponds to the first communication modality at least partly with respect to a remote device is to be interacted with at least partly via the second communication modality at the local device.

23. The system of claim 1, wherein the first communication modality includes at least voice communication, and the second communication modality includes at least textual communication.

24. The system of claim 1, wherein the first communication modality includes at least voice communication, and the second communication modality includes at least textual communication; and wherein the circuitry for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions comprises:
- circuitry for maintaining a voice connection associated with the one or more signals corresponding to the first communication modality.

25. The system of claim 1, wherein the first communication modality includes at least voice communication, and the second communication modality includes at least textual communication; and wherein the circuitry for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions comprises:
- circuitry for detecting responsive at least partly to the at least one intimacy setting that a voice connection associated with the one or more signals corresponding to voice communication is to be effectuated with the local device at least partially using textual input; and
- circuitry for maintaining the voice connection associated with the one or more signals corresponding to the voice communication.

26. The system of claim 1, wherein the circuitry for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions comprises:
- circuitry for accepting user text input as text data;
- circuitry for causing the text data to be converted to voice data; and
- circuitry for transmitting the voice data as part of a voice connection.

27. The system of claim 1, wherein the circuitry for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions comprises:
- circuitry for receiving voice data as part of a voice connection;
- circuitry for causing the voice data to be converted to text data; and
- circuitry for presenting the text data as text output.

28. The system of claim 1, wherein the first communication modality includes at least voice communication, and the second communication modality includes at least video communication.

29. The system of claim 1, wherein the system includes at least a part of the local device.

30. The system of claim 1, wherein the circuitry for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions comprises:
    circuitry for presenting to a local user via a user output interface of the local device a capability to participate in the communication via the second communication modality and thereby establish the at least one intimacy setting after the receiving one or more signals corresponding to a first communication modality.

31. The system of claim 1, wherein the circuitry for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions comprises:
    circuitry for detecting that the at least one intimacy setting indicates that a given communication that corresponds to the first communication modality at least partly while external to the local device is to be interacted with at least partly via the second communication modality at the local device.

32. A method for handling a communication, the method comprising:
    (A) receiving one or more signals corresponding to a first communication modality, the one or more received signals indicative of one or more transmissions from a device remote from a user ("remote device"); and
    (B) responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions, including at least:
      (1) receiving a user selection of the user preferred communication modality for interacting with the local device;
      (2) causing at least a portion of a communication to be converted from corresponding to the first communication modality to corresponding to the second communication modality, including at least:
        (a) initiating transmission away from the local device and to at least one conversion node at least the portion of the communication corresponding to the first communication modality for conversion at the at least one conversion node from corresponding to the first communication modality to corresponding to the second communication modality, wherein the at least one conversion node is external to the local device and includes at least one of a telecommunications node or an Internet node; and
        (b) receiving from the at least one conversion node as converted data at least the portion of the communication corresponding to the second communication modality, the receiving including at least one of receiving at least the portion of the communication at the local device or receiving and forwarding at least the portion of the communication toward the local device;
      (3) responding to the one or more signals corresponding to the first communication modality based at least partly on user interaction with the local device via a second communication modality in accordance with at least one intimacy setting that indicates a user preferred communication modality for interacting with the local device based at least partly upon an identity of a remote user associated with the remote device, wherein the at least one intimacy setting indicates a user preferred communication modality selected from at least two communication modalities for interacting with the local device during at least a portion of a communication;
      (4) responding to the one or more signals corresponding to the first communication modality based at least partly on user interaction with the local device via a second communication modality in accordance with at least one intimacy setting, wherein the at least one intimacy setting indicates that if a remote communication modality for at least a portion of a communication is at least partly the first communication modality then the local communication modality for user interaction with the local device for at least the portion of the communication shall be at least partly via the second communication modality, the first and the second communication modalities being different communication modalities and wherein the responding is performed at least in part by ascertaining the intimacy setting at least partly from a user selection stored before the communication and by, at the time of the communication, selecting the second communication modality based at least in part on a determination that the remote communication modality for at least the portion of the communication is at least partly the first communication modality and based at least in part on the ascertained intimacy setting; and
      (5) transmitting one or more notification signals from the local device to the remote device indicating that at least a portion of the communication may be effectuated as a mixed-modality communication, wherein the one or more transmitted notification signals are configured to facilitate the remote device in presenting at least partly via a user interface one or more options that include at least one of accepting the mixed- modality communication, refusing the mixed-modality communication, cancelling the communication or changing communication modalities and wherein the one or more notification signals include at least other than the communication itself,
wherein at least one of the (A) receiving one or more signals or the (B) responding to the one or more signals is at least partially implemented using one or more processing devices.

33. A computer program product, comprising:
at least one non-transitory computer readable medium including at least:
(A) one or more instructions for receiving one or more signals corresponding to a first communication modality, the one or more signals indicative of one or more transmissions from a device that is remote from a user ("remote device"); and
(B) one or more instructions for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions, including at least:
 (1) one or more instructions for receiving a user selection of the user preferred communication modality for interacting with the local device;
 (2) one or more instructions for causing at least a portion of a communication to be converted from corresponding to the first communication modality to corresponding to the second communication modality, including at least:
  (a) one or more instructions for initiating transmission away from the local device and to at least one conversion node of at least the portion of the communication corresponding to the first communication modality for conversion at the at least one conversion node from corresponding to the first communication modality to corresponding to the second communication modality, wherein the at least one conversion node is external to the local device and includes at least one of a telecommunications node or an Internet node; and
  (b) one or more instructions for receiving from the at least one conversion node as converted data at least the portion of the communication corresponding to the second communication modality, the one or more instructions for receiving configured to at least one of receive at least the portion of the communication at the local device or to receive and forward at least the portion of the communication toward the local device;
 (3) one or more instructions for responding to the one or more signals corresponding to the first communication modality based at least partly on user interaction with the local device via a second communication modality in accordance with at least one intimacy setting that indicates a user preferred communication modality for interacting with the local device based at least partly upon an identity of a remote user associated with the remote device, wherein the at least one intimacy setting indicates a user preferred communication modality selected from at least two communication modalities for interacting with the local device during at least a portion of a communication;
 (4) one or more instructions for responding to the one or more signals corresponding to the first communication modality based at least partly on user interaction with the local device via a second communication modality in accordance with at least one intimacy setting, wherein the at least one intimacy setting indicates that if a remote communication modality for at least a portion of a communication is at least partly the first communication modality then the local communication modality for user interaction with the local device for at least the portion of the communication shall be at least partly via the second communication modality, the first and the second communication modalities being different communication modalities and wherein the one or more instructions for responding are configured to ascertain the intimacy setting at least partly from a user selection stored before the communication and are further configured to, at the time of the communication, select the second communication modality based at least in part on a determination that the remote communication modality for at least the portion of the communication is at least partly the first communication modality and based at least in part on the ascertained intimacy setting; and
 (5) one or more instructions for transmitting one or more notification signals from the local device to the remote device indicating that at least a portion of the communication may be effectuated as a mixed-modality communication, wherein the one or more notification signals are configured to facilitate the remote device in presenting at least partly via a user interface one or more options that include at least one of accepting the mixed-modality communication, refusing the mixed-modality communication, cancelling the communication or changing communication modalities and wherein the one or more notification signals include at least other than the communication itself.

34. A system comprising:
(A) means for receiving one or more signals corresponding to a first communication modality, the one or more signals indicative of one or more transmissions from a device that is remote from a user ("remote device"); and
(B) means for responding to the one or more signals corresponding to the first communication modality based at least partly on user interaction with a device that is local to the user ("local device") via a second communication modality in accordance with at least one intimacy setting that indicates a user preferred communication modality for interacting with the local device based at least partly on one or more conditions, including at least:
 (1) means for receiving a user selection of the user preferred communication modality for interacting with the local device;
 (2) means for causing at least a portion of a communication to be converted from corresponding to the first communication modality to corresponding to the second communication modality, including at least:
  (a) means for initiating transmission away from the local device and to at least one conversion node of at least the portion of the communication corresponding to the first communication modality for conversion at the at least one conversion node from corresponding to the first communication modality to corresponding to the second communication modality, wherein the at least one conversion node is external to the local device and includes at least one of a telecommunications node or an Internet node; and
  (b) means for receiving from the at least one conversion node as converted data at least the portion of the communication corresponding to the second communication modality, the means for receiving configured to at least one of receive at least the portion of the communication at the local device or to receive and forward at least the portion of the communication toward the local device;

(3) means for responding to the one or more signals corresponding to the first communication modality based at least partly on user interaction with the local device via a second communication modality in accordance with at least one intimacy setting that indicates a user preferred communication modality for interacting with the local device based at least partly upon an identity of a remote user associated with the remote device, wherein the at least one intimacy setting indicates a user preferred communication modality selected from at least two communication modalities for interacting with the local device during at least a portion of a communication;

(4) means for responding to the one or more signals corresponding to the first communication modality based at least partly on user interaction with the local device via a second communication modality in accordance with at least one intimacy setting, wherein the at least one intimacy setting indicates that if a remote communication modality for at least a portion of a communication is at least partly the first communication modality then the local communication modality for user interaction with the local device for at least the portion of the communication shall be at least partly via the second communication modality, the first and the second communication modalities being different communication modalities and wherein the means for responding is configured to ascertain the intimacy setting at least partly from a user selection stored before the communication and is further configured to, at the time of the communication, select the second communication modality based at least in part on a determination that the remote communication modality for at least the portion of the communication is at least partly the first communication modality and based at least in part on the ascertained intimacy setting; and (5) means for transmitting one or more notification signals from the local device to the remote device indicating that at least a portion of the communication may be effectuated as a mixed-modality communication, wherein the one or more notification signals are configured to facilitate the remote device in presenting at least partly via a user interface one or more options that include at least one of accepting the mixed-modality communication, refusing the mixed-modality communication, cancelling the communication or changing communication modalities and wherein the one or more notification signals include at least other than the communication itself.

* * * * *